(12) United States Patent
Roberts et al.

(10) Patent No.: US 11,342,630 B2
(45) Date of Patent: May 24, 2022

(54) CATHOLYTES FOR SOLID STATE RECHARGEABLE BATTERIES, BATTERY ARCHITECTURES SUITABLE FOR USE WITH THESE CATHOLYTES, AND METHODS OF MAKING AND USING THE SAME

(71) Applicant: QuantumScape Battery, Inc., San Jose, CA (US)

(72) Inventors: Greg Roberts, San Jose, CA (US); Zhebo Chen, San Jose, CA (US); Will Hudson, Belmont, CA (US); Rainer Fasching, Mill Valley, CA (US); Tiffany Ho, Fremont, CA (US); Timothy P. Holme, Mountain View, CA (US); Mohit Singh, Santa Clara, CA (US); Aram Yang, Berkeley, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 178 days.

(21) Appl. No.: 16/326,852

(22) PCT Filed: Aug. 29, 2017

(86) PCT No.: PCT/US2017/049218
§ 371 (c)(1),
(2) Date: Feb. 20, 2019

(87) PCT Pub. No.: WO2018/044952
PCT Pub. Date: Mar. 8, 2018

(65) Prior Publication Data
US 2019/0198838 A1 Jun. 27, 2019

Related U.S. Application Data

(60) Provisional application No. 62/380,942, filed on Aug. 29, 2016.

(51) Int. Cl.
*H01M 10/0525* (2010.01)
*H01M 10/058* (2010.01)
(Continued)

(52) U.S. Cl.
CPC ......... *H01M 50/461* (2021.01); *H01M 4/134* (2013.01); *H01M 4/382* (2013.01);
(Continued)

(58) Field of Classification Search
CPC ....... H01M 50/461; H01M 2300/0094; H01M 4/382; H01M 4/405; H01M 10/0567;
(Continued)

(56) References Cited

U.S. PATENT DOCUMENTS

| 4,183,988 A | 1/1980 | Farrington et al. |
| 4,357,401 A | 11/1982 | Andre et al. |

(Continued)

FOREIGN PATENT DOCUMENTS

| CN | 1925203 A | 3/2007 |
| CN | 1949569 A | 4/2007 |

(Continued)

OTHER PUBLICATIONS

Response to the Communication dated Jul. 12, 2019 filed on Jan. 20, 2020 for Application No. EP16871533.2; 4 pages.
(Continued)

*Primary Examiner* — Christopher P Domone
(74) *Attorney, Agent, or Firm* — Squire Patton Boggs (US) LLP

(57) ABSTRACT

Provided herein are electrochemical cells having a solid separator, a lithium metal anode, and a positive electrode catholyte wherein the electrochemical cell includes a nitrile, dinitrile, or organic sulfur-including solvent and a lithium
(Continued)

Figure 1:
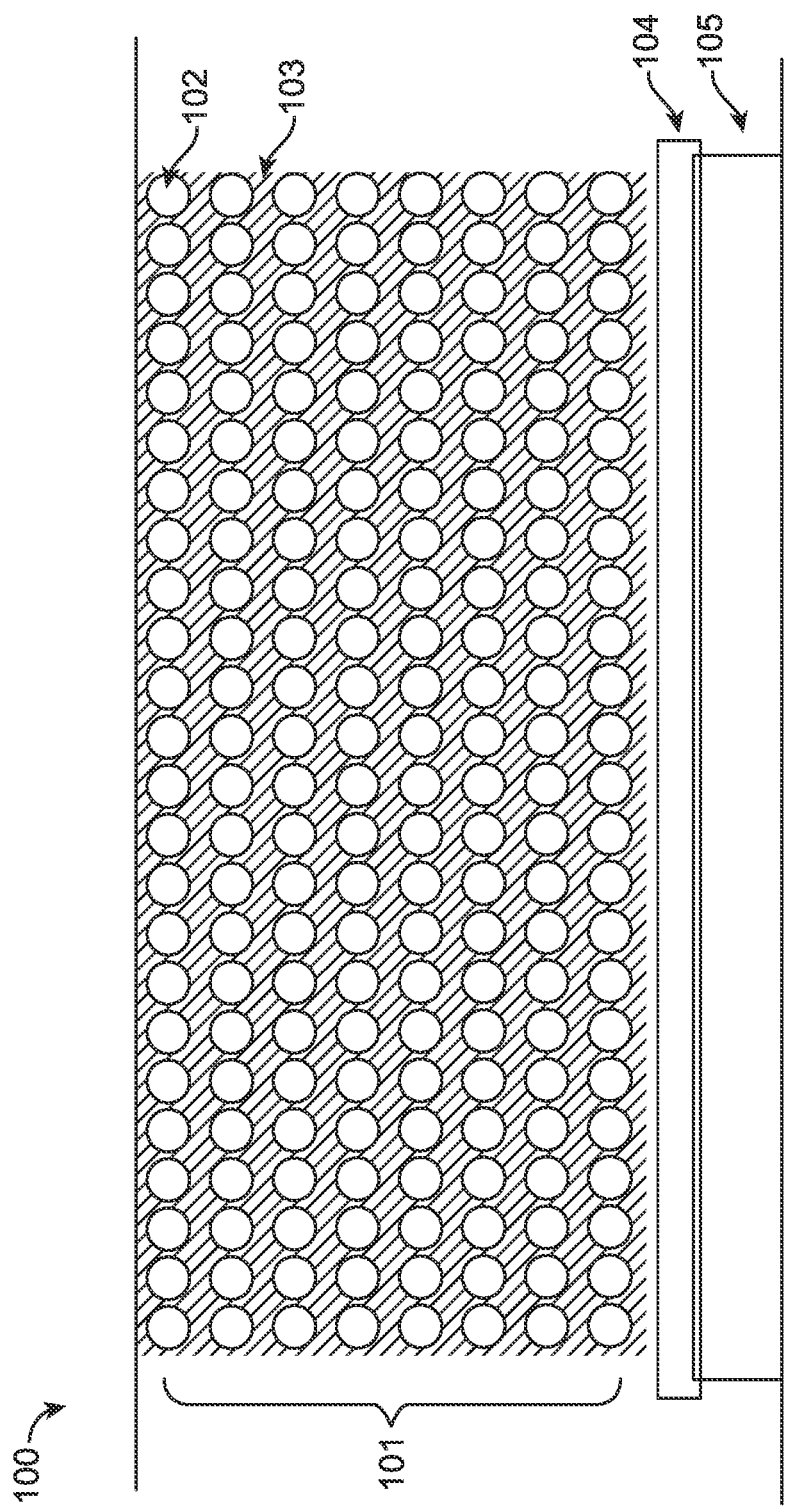

salt dissolved therein. Also set forth are methods of making and using these electrochemical cells.

21 Claims, 8 Drawing Sheets

(51) Int. Cl.
- H01M 4/134 (2010.01)
- H01M 4/38 (2006.01)
- H01M 10/0562 (2010.01)
- H01M 10/0567 (2010.01)
- H01M 50/46 (2021.01)
- H01M 10/052 (2010.01)
- H01M 10/056 (2010.01)

(52) U.S. Cl.
CPC ....... *H01M 10/052* (2013.01); *H01M 10/056* (2013.01); *H01M 10/058* (2013.01); *H01M 10/0525* (2013.01); *H01M 10/0562* (2013.01); *H01M 10/0567* (2013.01); *H01M 50/46* (2021.01); *H01M 2300/0028* (2013.01); *H01M 2300/0068* (2013.01); *H01M 2300/0071* (2013.01); *H01M 2300/0085* (2013.01); *H01M 2300/0094* (2013.01)

(58) Field of Classification Search
CPC ..... H01M 10/0569; H01M 2300/0028; H01M 2300/0068; H01M 2300/0071
See application file for complete search history.

(56) References Cited

U.S. PATENT DOCUMENTS

| | | | |
|---|---|---|---|
| 4,654,279 A | 3/1987 | Bauer et al. | |
| 4,668,736 A | 5/1987 | Robins et al. | |
| 4,868,262 A | 9/1989 | Esselborn et al. | |
| 4,990,413 A | 2/1991 | Lee et al. | |
| 4,990,587 A | 2/1991 | Shaw et al. | |
| 5,202,009 A | 4/1993 | Andrieu et al. | |
| 5,449,576 A | 9/1995 | Anani | |
| 6,030,720 A | 2/2000 | Chu et al. | |
| 6,066,417 A | 5/2000 | Cho et al. | |
| 6,200,707 B1 | 3/2001 | Takada et al. | |
| 6,210,836 B1 | 4/2001 | Takada et al. | |
| 6,277,524 B1 | 8/2001 | Kanno | |
| 6,365,300 B1 | 4/2002 | Ota et al. | |
| 6,656,641 B1 | 12/2003 | Kumar | |
| 7,416,815 B2 | 8/2008 | Ota et al. | |
| 7,901,598 B2 | 3/2011 | Ota | |
| 7,915,378 B2 | 3/2011 | Nishio et al. | |
| 8,524,393 B2 | 9/2013 | Kojima | |
| 8,546,019 B2 | 10/2013 | Lee et al. | |
| 8,697,292 B2 | 4/2014 | Kanno et al. | |
| 8,729,866 B2 | 5/2014 | Tamane et al. | |
| 8,871,391 B2 | 10/2014 | Liang et al. | |
| 8,962,194 B2 | 2/2015 | Senga et al. | |
| 9,172,112 B2 | 10/2015 | Hama et al. | |
| 9,172,113 B2 | 10/2015 | Ohtomo et al. | |
| 9,172,114 B2 | 10/2015 | Chao et al. | |
| 9,252,455 B1* | 2/2016 | Liu | H01M 50/451 |
| 9,553,332 B2 | 1/2017 | Chao et al. | |
| 9,634,354 B2 | 4/2017 | Chao et al. | |
| 9,819,024 B2 | 11/2017 | Chao et al. | |
| 10,116,001 B2 | 10/2018 | Chen et al. | |
| 10,374,254 B2 | 8/2019 | Berkel et al. | |
| 10,535,878 B2 | 1/2020 | Chao et al. | |
| 10,826,115 B2 | 11/2020 | Holme et al. | |
| 11,139,479 B2 | 10/2021 | Chao et al. | |
| 11,145,898 B2 | 10/2021 | Van Berkel et al. | |
| 11,211,611 B2 | 12/2021 | Chao et al. | |
| 2003/0031931 A1 | 2/2003 | Obrovac et al. | |
| 2003/0157409 A1 | 8/2003 | Huang | |
| 2003/0198870 A1 | 10/2003 | Wariishi et al. | |
| 2004/0096747 A1 | 5/2004 | Schwake | |
| 2005/0026037 A1 | 2/2005 | Riley et al. | |
| 2006/0068296 A1 | 3/2006 | Nakagawa et al. | |
| 2006/0166003 A1 | 7/2006 | Khabashesku et al. | |
| 2006/0216603 A1 | 9/2006 | Choi | |
| 2006/0246355 A1 | 11/2006 | Min et al. | |
| 2007/0015022 A1 | 1/2007 | Chang et al. | |
| 2007/0117007 A1 | 5/2007 | Visco et al. | |
| 2007/0117026 A1 | 5/2007 | Kumar et al. | |
| 2007/0160911 A1 | 7/2007 | Senga et al. | |
| 2007/0172739 A1 | 7/2007 | Visco et al. | |
| 2007/0231704 A1 | 10/2007 | Inda et al. | |
| 2008/0131781 A1 | 6/2008 | Yong et al. | |
| 2008/0200589 A1 | 8/2008 | Hubschmid | |
| 2008/0220334 A1 | 9/2008 | Inda | |
| 2009/0087751 A1 | 4/2009 | Kondo et al. | |
| 2009/0136830 A1 | 5/2009 | Gordon | |
| 2009/0182066 A1 | 7/2009 | Yang | |
| 2009/0208806 A1 | 8/2009 | Izuhara et al. | |
| 2009/0226816 A1 | 9/2009 | Yoshida et al. | |
| 2010/0019194 A1 | 1/2010 | Fujiwara et al. | |
| 2010/0028768 A1 | 2/2010 | Morita et al. | |
| 2010/0151335 A1 | 6/2010 | Senga et al. | |
| 2010/0183924 A1 | 7/2010 | Song et al. | |
| 2011/0076570 A1 | 3/2011 | Hama et al. | |
| 2011/0229765 A1 | 9/2011 | Barker et al. | |
| 2011/0259505 A1 | 10/2011 | Lee et al. | |
| 2011/0262816 A1 | 10/2011 | Amatucci | |
| 2011/0311875 A1 | 12/2011 | Lee et al. | |
| 2012/0094185 A1 | 4/2012 | Tsuchida et al. | |
| 2012/0115763 A1 | 5/2012 | Patil et al. | |
| 2012/0196186 A1 | 8/2012 | Richard | |
| 2012/0208062 A1 | 8/2012 | Zhou et al. | |
| 2012/0244411 A1 | 9/2012 | Takamori et al. | |
| 2012/0276459 A1 | 11/2012 | Im et al. | |
| 2013/0004843 A1 | 1/2013 | Suzuki et al. | |
| 2013/0040208 A1 | 2/2013 | Kanno et al. | |
| 2013/0052509 A1 | 2/2013 | Halalay et al. | |
| 2013/0095358 A1 | 4/2013 | Schubert et al. | |
| 2013/0108934 A1 | 5/2013 | Lee et al. | |
| 2013/0216910 A1 | 8/2013 | Obrovac | |
| 2013/0230778 A1 | 9/2013 | Saimen et al. | |
| 2014/0023940 A1 | 1/2014 | Zaghib et al. | |
| 2014/0065513 A1 | 3/2014 | Badding et al. | |
| 2014/0072866 A1* | 3/2014 | Kitada | B60L 50/64 429/200 |
| 2014/0093785 A1 | 4/2014 | Sugiura et al. | |
| 2014/0141341 A1 | 5/2014 | Ohtomo et al. | |
| 2014/0170465 A1* | 6/2014 | Visco | H01M 4/366 429/144 |
| 2014/0170504 A1 | 6/2014 | Baek et al. | |
| 2014/0193693 A1 | 7/2014 | Hoshina et al. | |
| 2014/0193695 A1 | 7/2014 | Hoshina et al. | |
| 2014/0197800 A1 | 7/2014 | Nagase et al. | |
| 2014/0363745 A1 | 12/2014 | Hirayama | |
| 2015/0017548 A1 | 1/2015 | Kato et al. | |
| 2015/0037687 A1 | 2/2015 | Kanno | |
| 2015/0056496 A1 | 2/2015 | Liang et al. | |
| 2015/0085423 A1 | 3/2015 | Ciocanel et al. | |
| 2015/0099190 A1* | 4/2015 | Holme | C04B 41/5027 429/322 |
| 2015/0111110 A1 | 4/2015 | Watanabe et al. | |
| 2015/0118574 A1 | 4/2015 | Visbal et al. | |
| 2015/0171463 A1 | 6/2015 | Dudney et al. | |
| 2015/0200420 A1 | 7/2015 | Holme et al. | |
| 2015/0287986 A1 | 10/2015 | Affinito et al. | |
| 2016/0156065 A1 | 6/2016 | Visco et al. | |
| 2016/0164136 A1 | 6/2016 | Higuchi et al. | |
| 2016/0181585 A1 | 6/2016 | Choi et al. | |
| 2016/0190638 A1 | 6/2016 | Sugiura et al. | |
| 2016/0190640 A1 | 6/2016 | Visco et al. | |
| 2017/0005367 A1 | 1/2017 | Van Berkel et al. | |
| 2017/0162901 A1 | 1/2017 | Chen et al. | |
| 2017/0294678 A1* | 10/2017 | Lee | H01M 10/058 |

(56) References Cited

U.S. PATENT DOCUMENTS

| | | | |
|---|---|---|---|
| 2019/0097262 | A1 | 3/2019 | Chen et al. |
| 2020/0067137 | A1 | 2/2020 | Van Berkel et al. |

FOREIGN PATENT DOCUMENTS

| | | | |
|---|---|---|---|
| CN | 101013761 | A | 8/2007 |
| CN | 101174698 | A | 5/2008 |
| CN | 101425604 | A | 5/2009 |
| CN | 101542777 | A | 9/2009 |
| CN | 102106030 | A | 6/2011 |
| CN | 104011926 | A | 8/2014 |
| CN | 104143656 | A | 11/2014 |
| CN | 104159869 | A | 11/2014 |
| CN | 104377385 | A | 2/2015 |
| CN | 104538670 | A | 4/2015 |
| DE | 19825807 | A1 | 12/1998 |
| EP | 0 977 296 | A1 | 2/2000 |
| EP | 2983231 | A1 | 2/2016 |
| JP | S57 108831 | | 7/1982 |
| JP | 2001-316583 | | 11/2001 |
| JP | 2003217663 | A | 7/2003 |
| JP | 2007-273214 | A | 10/2007 |
| JP | 2007-273217 | | 10/2007 |
| JP | 2009-176541 | A | 8/2009 |
| JP | 2011-44249 | | 3/2011 |
| JP | 2012-54212 | | 3/2012 |
| JP | 2012146512 | A | 8/2012 |
| JP | 2013-12416 | A | 1/2013 |
| JP | 2013-045683 | | 3/2013 |
| JP | 2013-80616 | A | 5/2013 |
| JP | 2014-38755 | | 2/2014 |
| JP | 2014-241240 | | 12/2014 |
| JP | 2015050072 | A | 3/2015 |
| KR | 2014-0095658 | | 8/2014 |
| WO | WO 2012/156795 | A1 | 11/2012 |
| WO | WO 2012/156795 | A8 | 11/2012 |
| WO | WO 2013/125485 | A1 | 8/2013 |
| WO | WO 2014/073197 | A1 | 5/2014 |
| WO | WO 2014/186634 | A2 | 11/2014 |

OTHER PUBLICATIONS

Extended European Search Report for EP Application No. 16871533.2 dated Jun. 26, 2019, 10 pages.

Takada et al., "Solid-state lithium battery with graphite anode", Solid State Ionics, Mar. 1, 2003, vol. 158, No. 3-4, pp. 269-274.

International Search Report and Written Opinion of PCT/US2016/039424 dated Nov. 3, 2016, 15 pages.

International Search Report and Written Opinion of PCT/US2014/038283 dated Nov. 17, 2014, 17 pages.

International Search Report and Written Opinion of PCT/US2016/064492 dated Feb. 7, 2017, 13 pages.

International Search Report and Written Opinion of PCT/US2017/049218 dated Jan. 4, 2018, 15 pages.

Adams, S. et al., "Structural requirements for fast lithium ion migration in $Li_{10}GeP_2S_{12}$", J. Mater. Chem., 2012, 22, pp. 7687-7691.

Amaresh, S. et al., "Aluminum based sulfide solid lithium ionic conductors for all solid state batteries," Nanoscale, 2014, vol. 6, pp. 6661-6667.

Aetukuri, Nagaphani B. et al., "Flexible Ion-Conducting Composite Membranes for Lithium Batteries," Adv. Energy Mater., 2015, 1500265, 6 pages.

Ahn, Byung Tae, et al., "Synthesis and Lithium Conductivities of $Li_2SiS_3$ and $Li_4SiS_4$", Mat. Res. Bull., 1989, vol. 24, pp. 889-897.

Aihara, Yuichi et al., "The electrochemical characteristics and applicability of an amorphous sulfide based solid ion conductor for the next generation solid-state lithium secondary batteries", Front. Energy Res., May 13, 2016, pp. 1-8.

Andrews, Lester, et al., "Infrared Spectra of $P_4S_{10}$ and its Decomposition Products in Solid Argon," Inorganic Chemistry, 1990, vol. 29, pp. 5222-5225.

Anonymous, "A Binding Matter," Ceramic Industry Magazine, Oct. 1, 2001, 6 pages; website: http://www.ceramicindustry.com/articles/82746-a-binding-matter.

Aotani, Noboru, "Synthesis and electrochemical properties of lithium ion conductive glass, $Li_3PO_4$—$Li_2$—S—$SiS_2$,", Solid State Ionics, 1994, vol. 68, pp. 35-39.

Bartholomew et al., "Electrical properties of new glasses based on the $Li_2S$—$SiS_2$ system", Journal of Non-Crystalline Solids, 1999, vol. 256 & 257, pp. 242-247.

Bhandari et al., "Origin of Fast Ion Conduction in $Li_{10}GeP_2S_{12}$, a Superionic Conductor", J. Phys. Chem. C, 2016, vol. 120, pp. 29002-29010.

Blanga, R. et al., "The search for a solid electrolyte, as a polysulfide barrier, for lithium/sulfur batteries", J Solid State Electrochem, Jul. 2016, 12 pages.

Boyle, Maureen A. et al., "Epoxy Resins", ASM Handbook, vol. 21, Composites, 2001, pp. 79-89.

Bron, P. et al., "$Li_{10}Si_{0.3}Sn_{0.7}P_2S_{12}$—A low-cost and low-grain-boundary-resistance lithium superionic conductor", Journal of Power Sources, vol. 329, 2016, pp. 530-535.

Bron, P. et al., "$Li_{10}SnP_2S_{12}$: An Affordable Lithium Superionic Conductor", J. Am. Chem. Soc., 2013, vol. 135, pp. 15694-15697.

Camino et al., "Polydimethylsiloxane thermal degradation Part 1. Kinetic aspects", Polymer, vol. 42, No. 6, Mar. 2001, pp. 2395-2402.

Chen et al., "A new composite solid electrolyte $PEO/Li_{10}GeP_2S_{12}/SN$ for all-solid-state lithium battery," Electrochimica Acta, vol. 210, 2016, pp. 905-914.

Chen, M.-H., "Update on Dental Nanocomposites", J Dent Res, 2010, 89(6), pp. 549-560.

Cramer, N.B. et al., "Recent Advances and Developments in Composite Dental Restorative Materials", J Dent Res, 2011, 90(4), pp. 402-416.

Creus et al., "The Use of Ionic and Mixed Conductive Glasses in Microbatteries", Materials Science and Engineering, 1989, B3, pp. 109-112.

Creus et al., "Thin films of ionic and mixed conductive glasses: their use in microdevices", Solid State Ionics, 1992, vol. 53-56, pp. 641-646.

Croce, F. et al., "Physical and Chemical Properties of Nanocomposite Polymer Electrolytes", J. Phys. Chem. B, 1999, 103, pp. 10632-10638.

De Klerk, Niek J.J. et al., "Diffusion Mechanism of Li Argyrodite Solid Electrolytes for Li-Ion Batteries and Prediction of Optimized Halogen Doping: The Effect of Li Vacancies, Halogens, and Halogen Disorder", Chem. Mater. 2016, vol. 28, pp. 7955-7963.

Deiseroth, Hans-Jorg, et al., "$Li_6PS_5X$: A Class of Crystalline Li Rich Solids with an Unusually High Li+ Mobility," Angew. Chem. Int. Ed., 2008, vol. 47, pp. 755-758.

Du et al., "Structures, Thermodynamics, and $Li^+$ Mobility of $Li_{10}GeP_2S_{12}$: A First-Principles Analysis", J. Phys. Chem. C 2014, vol. 118, pp. 10590-10595.

Duffy et al., "Electroless deposition and characterization of Fe/FeOx nanoparticles on porous carbon microspheres: structure and surface reactivity", J. Mater. Chem A, 2013, vol. 1, pp. 6043-6050.

Duluard et al., "Lithium conducting solid electrolyte $Li_{1.3}Al_{0.3}Ti_{1.7}(PO_4)_3$ obtained via solution chemistry", Journal of the European Ceramic Society, 2013, vol. 33, pp. 1145-1153.

Eckert et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR," Chem. Mater., 1990, vol. 2, pp. 273-279.

Fu, Kun (Kelvin) et al., "Flexible, solid-state, ion-conducting membrane with 3D garnet nanofiber networks for lithium batteries", PNAS, vol. 113, No. 26, 2016, pp. 7094-7099.

Goodman, Sidney H., "Epoxy Resins", Handbook of Thermoset Plastics, 1999, pp. 193-268.

Hassoun et al., "A structural, spectroscopic and electrochemical study of a lithium ion conducting $Li_{10}GeP_2S_{12}$ solid electrolyte", Journal of Power Sources, 229, 2013, pp. 117-122.

Hayashi, Akitoshi, et al., "Characterization of $Li_2S$—$P_2S_5$ glass-ceramics as a solid electrolyte for lithium secondary batteries", Solid State Ionics, 2004, vol. 175, pp. 683-686.

(56) References Cited

OTHER PUBLICATIONS

Hayashi, Akitoshi, et al., "Characterization of $Li_2S$—$SiS_2Li_3MO_3$ (M=B, Al, Ga and In) oxysulfide glasses and their application to solid state lithium secondary batteries," Solid State Ionics, 2002, vol. 152-153, pp. 285-290.

Hayashi, Akitoshi, et al., "Development of sulfide glass-ceramic electrolytes for all-solid-state lithium rechargeable batteries", J. Solid State Electrochem, 2010, vol. 14, pp. 1761-1767.

Hayashi, Akitoshi, et al., "Formation of Li superionic crystals from the $Li_2S$—$P_2S_5$ melt-quenched glasses", J. Mater Sci, 2008, vol. 43, pp. 1885-1889.

Hayashi, Akitoshi, et al., "Formation of superionic crystals from mechanically milled $Li_2S$—$P_2S_5$ glasses", Electrochemistry Communications, 2003, vol. 5, pp. 111-114.

Hayashi, Akitoshi, et al., "Improvement of chemical stability of $Li_3PS_4$ glass electrolytes by adding MA (M=Fe, Zn, and Bi) nanoparticles", Journal of Materials Chemistry A, 2013, vol. 1, pp. 6320-6326.

Hayashi, Akitoshi, et al., "Preparation of $Li_2S$—$P_2S_5$ Amorphous Solid Electrolytes by Mechanical Milling," Journal of the American Ceramic Society, 2001, vol. 84, pp. 477-479.

Hirai, Koichi, et al., "Thermal and electrical properties of rapidly quenched glasses in the systems $LI_2S$—$SiS_2$—$Li_xMO_y$ ($Li_xMO_y$= $Li_xSiO_4$, $Li_2SP_4$)", Solid State Ionics, 1995, vol. 78, pp. 269-273.

Hu, C.H. et al., "Insights into structural stability and Li superionic conductivity of $Li_{10}GeP_2S_{12}$ from first-principles calculations", Chemical Physics Letters, vol. 591, 2014, pp. 16-20.

Hu, Y-W., et al., "Ionic Conductivity of Lithium Orthosilicate-Lithium Phosphate Solid Solutions", J. Electrochem. Soc., 1977, vol. 124, No. 8, pp. 1240-1242.

Inada, T. et al., "All solid-state sheet battery using lithium inorganic solid electrolyte, thio-LISICON", Journal of Power Sources, vol. 194, 2009, pp. 1085-1088.

Inada, T. et al., "Fabrications and properties of composite solid-state electrolytes", Solid State Ionics, vol. 158, 2003, pp. 275-280.

Inada, T. et al., "Silicone as a binder in composite electrolytes", Journal of Power Sources, vol. 119-121, 2003, pp. 948-950.

Kaib, Thomas, et al., "New Lithium Chalcogenidotetrelates, LiChT: Synthesis and Characterization of the LitConducting Tetralithium ortho-Sulfidostannate $Li^4SnS_4$", Chemistry of Materials, 2012, vol. 24, pp. 2211-2219.

Kamaya, Noriaki, et al., "A lithium superionic conductor," Nature Materials, Sep. 2011, vol. 10, pp. 682-686; and Supplementary Information, DOI:10.1038/NMAT3066, 3 pages.

Kang, Joonhee et al., "First-Principles Characterization of the Unknown Crystal Structure and Ionic Conductivity of $Li_7P_2S_8I$ as a Solid Electrolyte for High-Voltage Li Ion Batteries", J. Phys. Chem. Letters, 2016, vol. 7, pp. 2671-2675.

Kanno, R. et al., "New Lithium Solid Electrolytes, Thio-Lisicon: Materials Design Concept and Application to Solid State Battery", Solid State Ionics: Trends In The New Millennium, Dec. 7, 2002, pp. 13-22.

Kanno, Ryoji, "Lithium Ionic Conductor Thio-LISICON, the $Li_2S$—$GeS_2$—$P_2S_5$ System", Journal of the Electrochemical Society, 2001, vol. 148, pp. A742-A746.

Kanno, Ryoji, "Synthesis of a new lithium ionic conductor, thio-LISICON-lithium germanium sulfide system," Solid State Ionics, 2000, vol. 130, pp. 97-104.

Kato, Y. et al., "Discharge Performance of All-Solid-State Battery Using a Lithium Superionic Conductor $Li_{10}GeP_2S_{12}$", Electrochemistry, vol. 80, No. 10, 2012, pp. 749-751.

Kato, Y. et al., "Synthesis, structure and lithium ionic conductivity of solid solutions of $Li_{10}(Ge_{1-x}M_x)P_2S_{12}$ (M=Si, Sn)," Journal of Power Sources, 271, 2014, pp. 60-64.

Kennedy, John, H., et al., "A Highly Conductive Li+-Glass System: (1-x) ($0.4SiS_2$—$0.6Li_2S$)-xLiI", J. Electrochem. Soc., 1986, pp. 2437-2438.

Kobayashi, Takeshi, et al., "Interfacial reactions at electrode/electrolyte boundary in all solid-state lithium battery using inorganic solid electrolyte, thio-LISICON", Electrochimica Acta, 2008, vol. 53, pp. 5045-5050.

Koh et al., "Synthesis of lithium-beta-alumina by various ion-exchange and conversion processes", Solid State Ionics, vol. 220, 2012, pp. 32-38.

Kondo, S., et al., "New lithium ion conductors based on $Li_2S$—$SiS_2$ system", Solid State Ionics, vol. 53-56, 1992, pp. 1183-1186.

Kuhn, A. et al., "A new ultrafast superionic Li-conductor: ion dynamics in $Li_{11}Si_2PS_{12}$ and comparison with other tetragonal LGPS-type electrolytes", Phys. Chem. Chem. Phys., 2014, 16, pp. 14669-14674.

Kuhn, A. et al., "Single-crystal X-ray structure analysis of the superionic conductor $Li_{10}GeP_2S_{12}$", Phys. Chem. Chem. Phys., 2013, vol. 15, pp. 11620-11622.

Kuhn, A. et al., "Tetragonal $Li_{10}GeP_2S_{12}$ and $Li_7GePS_8$—exploring the Li ion dynamics in LGPS Li electrolytes", Energy Environ. Sci., 2013, vol. 6, pp. 3548-3552.

Kuhn, A. et al., "Ultrafast Li Electrolytes Based on Abundant Elements: $Li_{10}SNP_2S_{12}$ and $Li_{11}Si_2PS_{12}$," Feb. 19, 2014: arXiv: 1402.4586; 7 pages.

Kuhn, A. et al., "Ultrafast Li Electrolytes Based on Abundant Elements: $Li_{10}SnP_2S_{12}$ and $Li_{11}Si_2PS_{12}$", Supporting Information, Feb. 19, 2014: arXiv: 1402.4586; 9 pages.

Kumar et al., "Composite Electrolytes for Lithium Rechargeable Batteries", Journal of Electroceramics, 2000, vol. 5:2, pp. 127-139.

Langer, Frederieke et al., "Microstructure and temperature dependent lithium ion transport of ceramic-polymer composite electrolyte for solid-state lithium ion batteries based on garnet-type $Li_7La_3Zr_2O_{12}$", Solid State Ionics, 2016, vol. 291, pp. 8-13.

Leal-Gonzalez, J., et al., "Structure of Lithium Sulfide, $LiGaS_2$," Acta. Cryst., 1990, pp. 2017-2019.

Li, Qin et al., "Atomistic investigation of the nanoparticle size and shape effects on ionic conductivity of solid polymer electrolytes," Solid State Ionics, 268, 2014, pp. 156-161.

Lim, Young Jun et al., "Ceramic-Based Composite Solid Electrolyte for Lithium-Ion Batteries", 2015, vol. 80, pp. 1100-1103.

Liu, Wei et al., "Ionic Conductivity Enhancement of Polymer Electrolytes with Ceramic Nanowire Fillers," Nano Lett., 2015, 15 (4), pp. 2740-2745.

Liu, Zengcai, et al., "Anomalous High Iconic Conductivity of Nanoporous $R-Li_3PS_4$, Journal of the American Chemical Society", 2012, 4 pages.

Liu, Zhangiang, et al., "High performance $Li_2S$-$P_2S_5$ solid electrolyte induced by selenide", Journal of Power Sources, 2014, vol. 260, pp. 264-267.

Mcgrogan, Frank P. et al., "Compliant Yet Brittle Mechanical Behavior of $Li_2S$—$P_2S_5$ Lithium-Ion-Conducting Solid Electrolyte", Adv. Energy Mater., 2017, 1602011, 5 pages; DOI: 10.1002/aenm.201602011.

Menetrier, M, et al., "Iconic conduction in $B_2S_3$—$Li_2S$—LiI glasses", Solid State Ionics, 1992, vol. 53-56, pp. 1208-1213.

Menetrier, M. et al., "Electrochemical Properties of $B_2S_3$—$Li_2S$—LiI Vitreous Electrolytes", J. Electrochem. Soc, 1984, 131(9), pp. 1971-1973.

Mercier, Rene, et al., "Superionic Conduction in $Li_2S$—$P_2S_5$—LiI-Glasses", Solid State Ionics, 1981, vol. 5, pp. 663-666.

Minami, Keiichi, et al., "Electrical and electrochemical properties of the $70Li_2S \cdot (30-x)P_2S_5 \cdot _xP_2O_5$ glass-ceramic electrolytes", Solid State Ionics, 2008, vol. 179, pp. 1282-1285.

Minami, Keiichi, et al., "Electrical and electrochemical properties of glass-ceramic electrolytes in the systems $Li_2S$—$P_2S_5$—$P_2S_3$ and $Li_2S$—$P_2S_5$—$P_2O_5$", Solid State Ionics, 2011, vol. 192, pp. 122-125.

Minami, Keiichi, et al., "Lithium ion conductivity of the $Li_2S$—$P_2S_5$ glass-based electrolytes prepared by the melt quenching method", Solid State Ionics, 2007, vol. 178, pp. 837-841.

Minami, Tsutomu, "Fast Ion Conducting Glasses, Journal of Non-Crystalline Solids", 1985, vol. 73, pp. 273-284.

Minami, Tsutomu, et al., "Preparation and characterization of lithium ion-conducting oxysulfide glasses", Solid State Ionics, 2000, vol. 136-137, pp. 1015-1023.

(56) References Cited

OTHER PUBLICATIONS

Minami, Tsutomu, et al., "Recent progress of glass and glass-ceramics as solid electrolytes for lithium secondary batteries", Solid State Ionics, 2006, vol. 177, pp. 2715-2720.
Mizuno, Fuminori, et al., "All Solid-State Lithium Secondary Batteries Using High Lithium Ion Conducting $Li_2S$—$P_2S_5$ Glass-Ceramics," Chemistry Letters, 2002, pp. 1244-1245.
Mizuno, Fuminori, et al., "High lithium ion conducting glass-ceramics in the system $Li_2S$—$P_2S_5$", Solid State Ionics, 2006, vol. 177, pp. 2721-2725.
Mizuno, Fuminori, et al., "New, Highly Ion-Conductive Crystals Precipitated from $Li_2S$—$P_2S_5$ Glasses", Advanced Materials, 2005, vol. 17, No. 7, pp. 918-921.
Mo et al., "First Principles Study of the $Li_{10}GeP_2S_{12}$ Lithium Super Ionic Conductor Material", Chem. Mater., 2012, vol. 24, pp. 15-17.
Morimoto, Hideyuki, et al., "Mechanochemical Synthesis of New Amorphous Materials of $60Li_2S$—$40SiS_2$ with High Lithium Ion Conductivity", J. Am. Ceram. Soc., 1999, vol. 82, pp. 1352-1354.
Muramatsu, Hiromasa, et al., "Structural change of $Li_2S$—$P_2S_5$ sulfide solid electrolytes in the atmosphere", Solid State Ionics, 2011, vol. 182, pp. 116-119.
Murayama, Masahiro, et al., "Material Design of New Lithium Ionic Conductor thio-LISICON, in the $Li_2S$—$P_2S_5$ System," Solid State Ionics, 2004, vol. 170, pp. 173-180.
Murayama, Masahiro, et al., "Synthesis of New Lithium Ionic Conductor Thio-LISICON-Lithium Silicon Sulfides System", Journal of Solid State Chemistry, 2002, vol. 168, pp. 140-148.
Nairn, K. et al., "Ceramic-polymer interface in composite electrolytes of lithium aluminium titanium phosphate and polyetherurethane polymer electrolyte", Solid State Ionics, vol. 121, 1999, pp. 115-119.
Nairn, K. et al., "Polymer-ceramic ion-conducting composites", Solid State Ionics, vol. 86-88, 1996, pp. 589-593.
Nam, Young Jin et al., "Bendable and Thin Sulfide Solid Electrolyte Film: A New Electrolyte Opportunity for Free Standing and Stackable High-Energy All-Solid-State Lithium-Ion Batteries", Nano Lett., 2015, 15 (5), pp. 3317-3323.
Nam, Young Jin et al., *Supporting Information* "Bendable and Thin Sulfide Solid Electrolyte Film: A New Electrolyte Opportunity for Free Standing and Stackable High-Energy All-Solid-State Lithium-Ion Batteries", Nano Lett., 2015, 15 (5), pp. 3317-3323.
Norrel et al., "Anion exchange of Oxygen by Sulfur in $GeO_2$-based glasses", Proceedings of SPIE, vol. 4990, 2003, pp. 87-96.
Oh, G. et al., "Bulk-Type All Solid-State Batteries with 5 V Class $LiNi_{0.5}Mn_{1.5}O_4$ Cathode and $Li_{10}GeP_2S_{12}$ Solid Electrolyte", Chem. Mater., 2016, 28, pp. 2634-2640.
Ohtomo, Takamasa, et al., "Characteristics of the $Li_2O$—$Li_2S$—$P_2S_5$ glasses synthesized by the two-step mechanical milling, Journal of Non-Crystalline Solids," 2013, vol. 364, pp. 57-61.
Ohtomo, Takamasa, et al., "Electrical and electrochemical properties of $Li_2S$—$P_2O_5$ glass-ceramic electrolytes", Journal of Power Sources, 2005, vol. 146, pp. 715-718.
Ohtomo, Takamasa, et al., "Suppression of $H_2S$ gas from $Li_2S$—$P_2S_5$ glass electrolytes by the addition of $Li_2O$", The Electrochemical Society, Abstract #1189, Honolulu PRIME 2012, 1 page.
Ong, S. et al., "Phase stability, electrochemical stability and ionic conductivity of the $Li_{10\pm1}MP_2X_{12}$ (M=Ge, Si, Sn, Al or P and X=O, S or Se) family of superionic conductors," Energy Environ. Sci., 2013, 6, pp. 148-156.
Ooura, Yuji et al., "A new lithium-ion conducting glass ceramic in the composition of $75Li_2S \cdot 5P_2S_3 \cdot 20P_2S_5$(mol%)", Solid State Ionics 2014, vol. 262, pp. 733-737.
Patil, Deepak S. et al., "Ionic conductivity study of $LiI$-$Ga_2S_3$—$GeS_2$ chalcogenide glasses using a random-walk Approach", Pure Appl. Chem., 2014, pp. 1-11; DOI: 10.1515/pac-2014-1005.
Peutzfeldt, Anne et al., "Resin composites in dentistry: the monomer systems", Eur J Oral Sci, 1997, vol. 105, pp. 97-116.
Pham, Ha Q. et al., "Epoxy Resins", Ullmann's Encylclopedia of Industrial Chemistry, vol. 13, 2012, Wiley-VCH Verlag GmbH & Co. KGaA, Weinheim, pp. 155-244.

Pradel, A., et al., "Lithium Chalcogenide Conductive Glasses", Materials Chemistry and Physics, 1989, vol. 23, pp. 121-142.
Pradel, A., et al., "Ionically Conductive Chalcogenide Glasses", Journal of Solid State Chemistry, 1992, vol. 96, pp. 247-257.
Qu, Meng et al., "Nanomechanical Quantification of Elastic, Plastic, and Fracture Properties of $LiCoO_2$", Adv. Energy Mater., 2012, vol. 2, pp. 940-944.
Rangasamy et al., "An Iodide-Based $Li_7P_2S_8I$ Superionic Conductor," J. Am. Chem. Soc., 2015, vol. 137, pp. 1384-1387.
Rangasamy et al., "Heteroclite electrochemical stability of an I based $Li_7P_2S_8I$ superionic conductor", Angewandte Chemie: https://www.osti.gov/pages/servlets/purl/1185568.
Rao, R. Prasada, et al., "Synthesis and $Li^+$ ion Migration Studies of $Li_6PS_5X$ (X=Cl, Br, I)", Mater. Res. Soc. Symp. Proc., 2011, vol. 1331, DOI: 10.1557/opl.2011.41 24; 6 pages.
Rao, Rayavarapu et al., "Variation in structure and $Li^{30}$-ion migration in argyrodite-type $Li_6PS_5X$ (X=Cl, Br, I) solid electrolytes", J. Solid State Electrochem, 2012, vol. 16, pp. 1807-1813.
Sahu, Gayatri, et al., "Air-Stable, High-Conduction Solid Electrolytes of Arsenic-Substituted $Li_4SnS_4$", Energy & Environmental Science, 2014, vol. 7, pp. 1053-1058.
Sakuda, Atsushi et al., "Evaluation of elastic modulus of $Li_2S$—$P_2S_5$ glassy solid electrolyte by ultrasonic sound velocity measurement and compression test", 2013, Journal of the Ceramic Society of Japan 121 [11], pp. 946-949, 4 pages.
Sakuda, Atsushi, et al., "All-solid-state lithium secondary batteries using $LiCoO_2$ particles with pulsed laser deposition coatings of $Li_2S$—$P_2S_5$ solid electrolytes", Journal of Power Sources, 2011, vol. 196, pp. 6735-6741.
Sakuda, Atsushi, et al., "Sulfide Solid Electrolyte with Favorable Mechanical Property for All-Solid-State Lithium Battery," Scientific Reports, 2013, 3:2261, DOI: 10.1038/srep02261, 5 pages.
Seino, Yoshikatsu, et al., "A sulphide lithium super ion conductor is superior to liquid ion conductors for use in rechargeable batteries", Energy & Environmental Science, 2014, vol. 7, pp. 627-631.
Seino, Yoshikatsu, et al., "Synthesis and electrochemical properties of $Li_2S$—$B_2S_3$—$LL_iSiO_4$", Solid State Ionics, 2006, vol. 177, pp. 2601-2603.
Seino, Yoshikatsu, et al., "Synthesis of phosphorous sulfide solid electrolyte and all-solid-state lithium batteries with graphite electrode", Solid State Ionics, 2005, pp. 2389-2393.
Seino, Yoshikatsu, et al., Electronic Supplementary Material (ESI) for Energy & Environmental Science, This journal is © The Royal Society of Chemistry, 2014, 4 pages.
Seo, Inseok, et al., "Fast lithium ion conducting solid state thin-film electrolytes based on lithium thio-germanate materials", Acta Materialia, 2011, vol. 59, pp. 1839-1846.
Seo, Inseok, et al., "Structural Properties of Lithium Thio-Germanate Thin Film Electrolytes Grown by Radio Frequency Sputtering," Inorganic Chemistry, 2011, vol. 50, pp. 2143-2150.
Shafizadeh, F. et al. "Thermal degradation of cellulose in air and nitrogen at low temperatures," Journal of Applied Polymern Science, vol. 23, Issue 5, Mar. 1, 1979, pp. 1431-1442.
Sistla, Ramesh, K. et al., "Structural studies on $xLi_2S$-$(1-x)P_2S_5$ glasses by X-ray diffraction and molecular dynamics simulation", Journal of Non-Crystalline Solids, 2004, vol. 349, pp. 54-59.
Skaarup, Steen et al., "Mixed Phase Solid Electrolytes With Non-conducting Polymer Binder", Solid State Ionics, 1990, 40/41, pp. 1021-1024.
Skaarup, Steen et al., "Mixed Phase Solid Electrolytes", Solid State Ionics, 1988, vol. 28-30, pp. 975-978.
Skelhorn, David, "Particulate Fillers in Elastomers", Particulate-filled polymer composites, $2^{nd}$ Edition, Shawbury: Rapra Technology Limited, 2003, pp. 303-356.
Sun, Y. et al., "Oxygen substitution effects in $Li_{10}GeP_2S_{12}$ solid electrolyte", Journal of Power Sources, 2016, vol. 324, pp. 798-803.
Suzuki, K. et al., "Synthesis, structure, and electrochemical properties of crystalline Li—P—S—O solid electrolytes: Novel lithium-conducting oxysulfides of $Li_{10}GeP_2S_{12}$ family", Solid State Ionics, vol. 288, May 2016, pp. 229-234.
Sveinbjornsson, Dadi, et al., "Ionic Conductivity and the Formation of Cubic $CaH_2$ in the $LiBH_4$—$Ca(BH_4)2$ Composit", Journal of Solid State Chemistry, 2014, vol. 211, pp. 81-89.

(56) References Cited

OTHER PUBLICATIONS

Tachez, Michel, et al., "Ionic Conductivity of and Phase Transition in Lithium Thiophosphate $Li_3PS_4$", Solid State Ionics, 1984, vol. 14, pp. 181-185.
Takada, K. et al., "Compatibility of Lithium Ion Conductive Sulfide Glass with Carbon-Lithium Electrode", J. Electrochem. Soc. 2003, vol. 150, No. 3, pp. A274-A277.
Takada, Kazunori, et al., "Electrochemical behaviors of $Li^+$ ion conductor $Li_3PO_4$—$Li_2S$—$SiS_2$", Journal of Power Sources, 1993, vol. 43-44, pp. 135-141.
Takada, Kazunori, et al., "Lithium ion conductive oxysulfide $Li_3PO_4$—$Li_3PS_4$", Solid State Ionics, 2005, vol. 176, pp. 2355-2359.
Takada, Kazunori, et al., "Solid State Lithium Battery with Oxysulfide glass", Solid State Ionics, 1996, vol. 86-88, pp. 877-882.
Takahara, Hikari, et al., "Application of Lithium Metal Electrodes to All-Solid-State Lithium Secondary Batteries Using $Li_3PO_4$_$Li_2S$—$SiS_2$ glass", Journal of the Electrochemical Society, 2004, vol. 151, No. 9, pp. A1309-A1313.
Tarhouchi, I. et al., "Electrochemical characterization of $Li_{10}SnP_2S_{12}$: An electrolyte or a negative electrode for solid state Li-ion batteries?", Solid State Ionics, vol. 296, 2016, pp. 18-25.
Tatsumisago, Masahiro, et al., "All-solid-state lithium secondary batteries using sulfide-based glass-ceramic electrolytes", Journal of Power Sources, 2006, vol. 159, pp. 193-199.
Teragawa, Shingo, et al., "Preparation of $Li_2S$—$P_2S_5$ solid electrolyte from N-methylformamide solution and application for all-solid-state lithium battery", Journal of Power Sources, 2014, vol. 248, pp. 939-942.
Thokchom, Joykumar S. et al., "Ionically Conducting Composite Membranes from the $Li_2O$—$Al_2O_3$—$TiO_2$—$P_2O_5$ Glass-Ceramic", J. Am. Ceram. Soc., 90 [2], 2007, pp. 462-466.
Trevey, James, et al., "Glass-ceramic $Li_2S$—$P_2S_5$ electrolytes prepared by a single step ball billing process and their application for all-solid-state lithium-ion batteries", Electrochemistry Communications, 2009, vol. 11, pp. 1830-1833.
Ujiie, Satoshi et al., "Conductivity of $70Li_2S\cdot 30P_2S_5$ glasses and glass-ceramics added with lithium halides", Solid State Ionics, vol. 263, 2014, pp. 57-61.
Ujiie, Satoshi, et al., "Preparation and electrochemical characterization of $(100-x)(0.7Li_2S\cdot 0.3P_2S_5)$ xLiBr glass-ceramic electrolytes", Mater Renew Sustain Energy, 2014, 3:18, pp. 1 of 8; DOI 10.1007/s40243-013-0018-x.
Villaluenga et al., "Compliant glass-polymer hybrid single ion-conducting electrolytes for lithium batteries", PNAS, Jan. 5, 2016, vol. 113, No. 1, pp. 52-57.
Wada, H. et al., "Preparation and Ionic Conductivity of New $B_2S_3$—$Li_2S$—LiI Glasses", Mat. Res. Bull., 1983, vol. 18, pp. 189-193.
Wall, L.A. et al., "The Depolymerization of Polymethylene and Polyethylene", J. Am. Chem. Soc., 1954, vol. 76 (13), pp. 3430-3437.
Wang, Y. et al., "Highly lithium-ion conductive thio-LISICON thin film processed by low-temperature solution method", Journal of Power Sources, 2013, vol. 224, pp. 225-229.
Wang, Y. et al., "Highly lithium-ion conductive thio-LISICON thin film processed by low-temperature solution method", *Supporting Information*, Journal of Power Sources, 2013, vol. 224, pp. 225-229.
Wang, Yan-Jie et al., "Characterization of [Poly(ethylene oxide)] $LiClO$—$Li_{1.3}Al_{0.3}Ti_{1.7}(PO_4)_3$ Composite Polymer Electrolytes with Poly(ethylene oxide)s of Different Molecular Weights", Journal of Applied Polymer Science, 2006, vol. 102, pp. 1328-1334.
Wang, Yiqun et al., "X-ray photoelectron spectroscopy for sulfide glass electrolytes in the systems $Li_2S$—$P_2S_5$ and $Li_2S$—$P_2S_5$—LiBr", Journal of the Ceramic Society of Japan, 2016, vol. 124, No. 5, pp. 597-601.
Weber, Dominik A. et al., "Structural Insights and 3D Diffusion Pathways within the Lithium Superionic Conductor $Li_{10}GeP_2S_{12}$", Chem. Mater., 2016, 28, pp. 5905-5915.
Wenzel, S. et al., "Direct Observation of the Interfacial Instability of the Fast Ionic Conductor $Li_{10}GeP_2S_{12}$ at the Lithium Metal Anode", Chem. Mater., 2016, vol. 28, pp. 2400-2407.
Westerhout, R. W. J. et al., "Kinetics of the Low-Temperature Pyrolysis of Polyethene, Polypropene, and Polystyrene Modeling, Experimental Determination, and Comparison with Literature Models and Data," Ind. Eng. Chem. Res., 1997, 36 (6), pp. 1955-1964.
Wieczorek et al., "Composite Polymeric Electrolytes", Electronic Materials: Science and Technology, 2008, vol. 10, pp. 1-70.
Wright, Charles D., "Epoxy Structural Adhesives," Structural Adhesives: Chemistry and Technology, Springer Science & Business Media, Dec. 6, 2012, pp. 113-179.
Xu et al., "One-dimensional stringlike cooperative migration of lithium ions in an ultrafast ionic conductor", Appl. Phys. Lett., vol. 101, 2012, 031901.
Yamashita et al., "Formation and ionic conductivity of $Li_2S$—$GeS_2$—$Ga_2S_3$ glasses and thin films", Solid State Ionics, 2003, vol. 158, pp. 151-156.
Yamauchi et al., "Preparation and ionic conductivities of $(100-x)(0.75Li_2S\cdot 0.25P_2S_5)\cdot xLiBH_4$ glass electrolytes", Journal of Power Sources, 2013, vol. 244, pp. 707-710.
Yubuchi et al., "Preparation of high lithium-ion conducting $Li_6PS_5Cl$ solid electrolyte from ethanol solution for all-solid-state lithium batteries", Journal of Power Sources, 2015, vol. 293, pp. 941-945.
Zhang, Hanjun (Henry) et al., "Preparation and characterization of composite electrolytes based on PEO(375)-grafted fumed silica", Solid State Ionics, vol. 178, 2008, pp. 1975-1983.
Zhu, Zhuoying et al., "$Li_3Y(PS_4)_2$ and $Li_5PS_4Cl_2$: New Lithium Superionic Conductors Predicted from Silver Thiophosphates using Efficiently Tiered Ab Initio Molecular Dynamics Simulations," Chem. Mater., 2017, vol. 29 (6), pp. 2474-2484.
Zhu, Zhuoying et al., "$Li_3Y(PS_4)_2$ and $Li_5PS_4Cl_2$: New Lithium Superionic Conductors Predicted from Silver Thiophosphates using Efficiently Tiered Ab Initio Molecular Dynamics Simulations," Chem. Mater., 2017, vol. 29, No. 6, pp. 2474-2484, and Supporting Information, 13 pages.
English translation of the third office action of Chinese Patent application No. 201680036919.3 dated Jul. 5, 2021.
Second Office Action of Japanese Patent Application No. 2018-528692 dated Sep. 7, 2021, along with the English translation.

* cited by examiner

CATHOLYTES FOR SOLID STATE RECHARGEABLE BATTERIES, BATTERY ARCHITECTURES SUITABLE FOR USE WITH THESE CATHOLYTES, AND METHODS OF MAKING AND USING THE SAME

CROSS-REFERENCE TO RELATED APPLICATIONS

This application is a National Stage Filing under 35 U.S.C. § 371 of International Patent Application No. PCT/US2017/049218, filed Aug. 29, 2017, which claims the benefit of priority to U.S. Provisional Patent Application No. 62/380,942, filed Aug. 29, 2016, the entire contents of each of which are herein incorporated by reference in their entirety for purposes.

FIELD

The present disclosure sets forth high voltage-stable electrolytes, such as dinitrile solvents and mixtures of dinitrile solvents and nitrile solvents, and organic sulfur-including solvents which include lithium salts, electrochemical cells and devices which include these electrolytes, and methods of making and using the same.

BACKGROUND

Conventional lithium rechargeable batteries use a porous polyolefin separator which is soaked with liquid electrolytes. This separator electrically insulates the positive and negative electrodes of the battery but remains conductive towards $Li^+$ ions. This conventional battery architecture relies on carbonate-based organic solvents, which suffer from flammability and leakage problems, to achieve commercially relevant ion-conductivity, cycle life, and shelf life metrics. Carbonates also have a limited (i.e., narrow) voltage stability window and are particularly unstable when stored at high voltages. Most importantly, carbonate solvents are not chemically compatible with all lithium metal negative electrodes.

Some researchers have attempted to use nitrile solvents in place of carbonate solvents. See, for example, Abu-Lebdeh, Y., et al., *Journal of Power Sources* 189 (2009) 576-579; Abu-Lebdeh, Y., et al., *Journal of The Electrochemical Society*, 156 (1) A60-A65 (2009); Long, S. et al., *Solid State Ionics* 161 (2003) 105-112; Geirhos, K. et al., *The Journal of Chemical Physics*, 143, 081101 (2015); Zachariah, M., et al. *J. Phys. Chem. C* 2015, 119, 27298-27306; and Alarco, P-J., et al., nature materials (3), July, 2004. However, these prior uses of nitrile solvents suffered from instability with low voltage anodes such as graphite or lithium metal which are used in high energy batteries. This was due in part because nitrile solvents are not able to form a passivating solid-electrolyte-interface (SEI) on low voltage anodes, such as lithium metal. To date, nitrile solvents have not, which makes nitrile solvents unusable in high energy (i.e., high voltage) batteries. As a result, these graphite and lithium metal anodes typically have, prior to the instant disclosure, required a carbonate co-solvent for the electrolyte.

Some researchers have electrospun or polymerized nitrile-based materials for battery applications, for example Zhou D., et al. (2015) *In Situ Synthesis of a Hierarchical All-Solid-State Electrolyte Based on Nitrile Materials for High-Performance Lithium-Ion Batteries. Adv. Energy Mater.*, 5: 1500353. doi: 10.1002/aenm.201500353. However, the impedance observed in these electrospun or polymerized nitrile-based materials high, the low temperature power capability of the batteries which used these electrospun or polymerized nitrile-based materials is poor, and the electrospun or polymerized nitrile-based materials could not block the formation of lithium dendrites at commercially relevant current densities and commercially relevant throughput amounts of of lithium during electrochemical cycling.

Accordingly, there exists a need for improved electrolytes for rechargeable batteries. Set forth herein are such improved electrolytes as well as other solutions to problems in the relevant field.

SUMMARY

In one embodiment, set forth herein is an electrochemical cell which includes: a lithium metal negative electrode;
   a solid separator; and
   a positive electrode,
wherein the positive electrode includes an active material and a catholyte,
wherein the catholyte includes a catholyte solvent and a lithium salt, wherein the catholyte solvent comprises a nitrile solvent, a dinitrile solvent, an organic sulfur-including solvent, or a combination thereof.

In a second embodiment, set forth herein is a catholyte including a nitrile solvent and a lithium salt,
   wherein the nitrile solvent is selected from acetonitrile, butyronitrile, benzonitrile, glutaronitrile, hexanenitrile, fluoroacetonitrile, nitroacetonitrile, malononitrile, ethoxyacetonitrile, methoxyacetonitrile, pentanenitrile, propanenitrile, succinonitrile, adiponitrile, and iso-butyronitrile;
   wherein the lithium salt is selected from $LiPF_6$, LiBOB, LiTFSi, $LiBF_4$, $LiClO_4$, $LiAsF_6$, LiFSI, $LiClO_4$, LiI, and a combination thereof; and
   wherein the catholyte is chemically compatible with a solid separator set forth herein.

In a third embodiment, set forth herein is a catholyte comprising an organic sulfur-including solvent, optionally a co-solvent, and a lithium salt,
   wherein the organic sulfur-including solvent is selected from ethyl methyl sulfone, dimethyl sulfone, sulfolane, allyl methyl sulfone, butadiene sulfone, butyl sulfone, methyl methanesulfonate, dimethyl sulfite, wherein the co-solvent is a carbonate solvent;
   wherein the lithium salt is selected from $LiPF_6$, LiBOB, LiTFSi, $LiBF_4$, $LiClO_4$, $LiAsF_6$, LiFSI, $LiClO_4$, LiI, and a combination thereof.

In a fourth embodiment, set forth herein is a method of using an electrochemical cell set forth herein, comprising charging the electrochemical cell to a voltage greater than 4.3V.

In a fifth embodiment, set forth herein is a method of storing an electrochemical cell, including providing an electrochemical cell set forth herein, wherein the electrochemical cell has greater than 20% state-of-charge (SOC); and storing the battery for at least one day.

In a sixth embodiment, set forth herein is a method for making a catholyte set forth herein which includes a nitrile solvent and a lithium salt, wherein the method includes providing a nitrile solvent, providing a lithium salt, mixing the nitrile solvent and the lithium salt to form a mixture, and optionally heating the mixture.

In a seventh embodiment, set forth herein is a method for making a catholyte set forth herein which includes an organic sulfur-including solvent and a lithium salt, wherein the method includes providing an organic sulfur-including solvent, providing a lithium salt, mixing the organic sulfur-including solvent and the lithium salt to form a mixture, and optionally heating the mixture.

BRIEF DESCRIPTIONS OF THE DRAWINGS

FIG. 1 shows a schematic of an example of an electrochemical cell having a catholyte in the positive electrode space which includes a dinitrile solvent.

Figure 2:
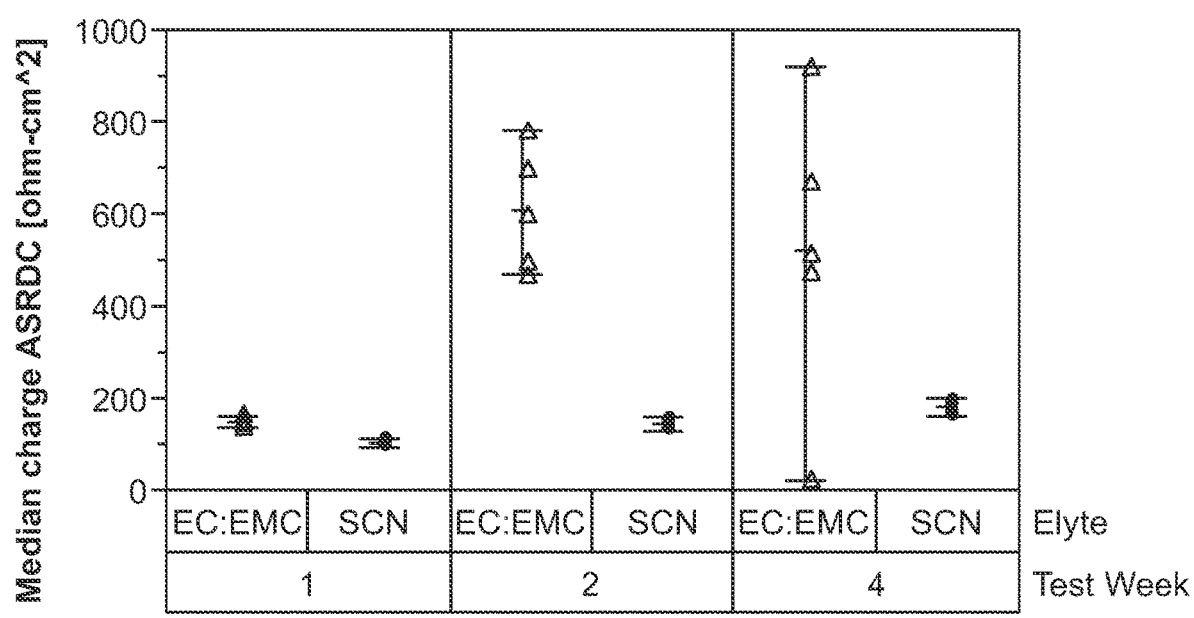

FIG. 2 shows a plot of the median charge ASR-DC ($\Omega$-cm$^2$) for two electrochemical cells, after storage at 4.6 V, and wherein one electrochemical cell includes a catholyte including succinonitrile (SCN) at 12 mol % LiBF$_4$ and wherein the other electrochemical cell includes a catholyte including EC:EMC+1 M LiPF$_6$+2 wt % monofluoroethylene carbonate (FEC). In the figure, circles refer to succinonitrile+12 mol % LiBF$_4$, and triangles refer to EC:EMC+1 M LiPF$_6$+2 wt % FEC. Elyte in FIG. 2 refers to electrolyte. EC refers to ethyl carbonate solvent. EMC refers to ethyl methyl carbonate solvent.

Figure 3:
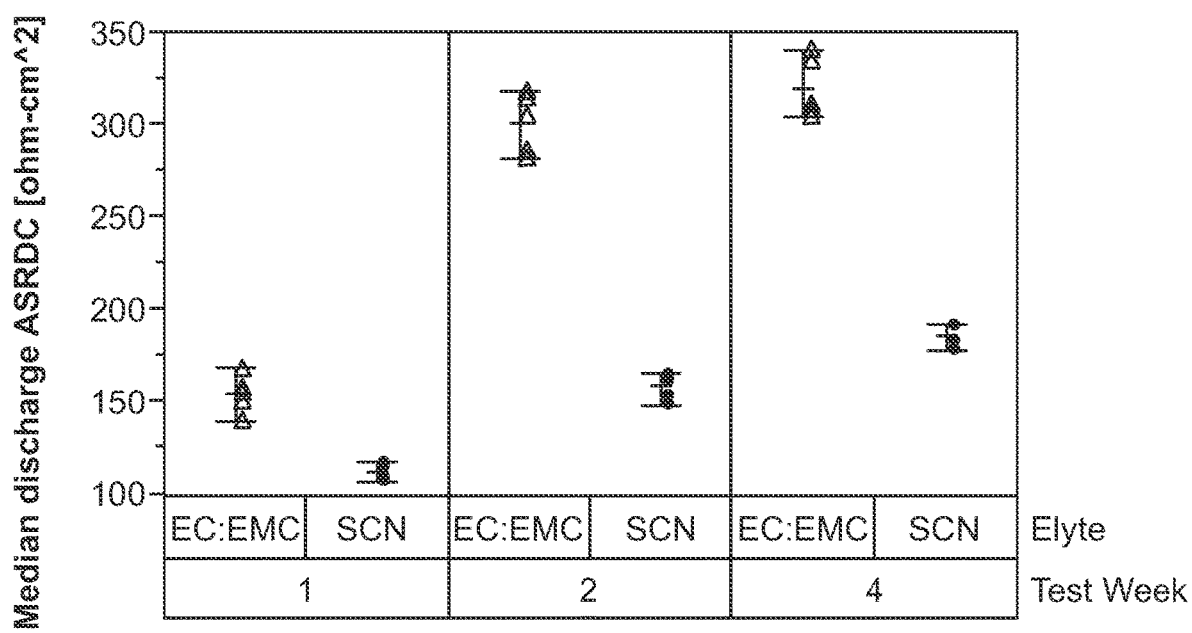

FIG. 3 shows a plot of the median discharge ASR-DC ($\Omega$-cm$^2$) for two electrochemical cells, after storage at 4.6 V, and wherein one electrochemical cell includes a catholyte including succinonitrile (SCN) at 12 mol % LiBF$_4$ and wherein the other electrochemical cell includes a catholyte including EC:EMC+1 M LiPF$_6$+2 wt % monofluoroethylene carbonate (FEC). In the figure, circles refer to succinonitrile+12 mol % LiBF$_4$, and triangles refer to EC:EMC+1 M LiPF$_6$+2 wt % FEC.

Figure 4:
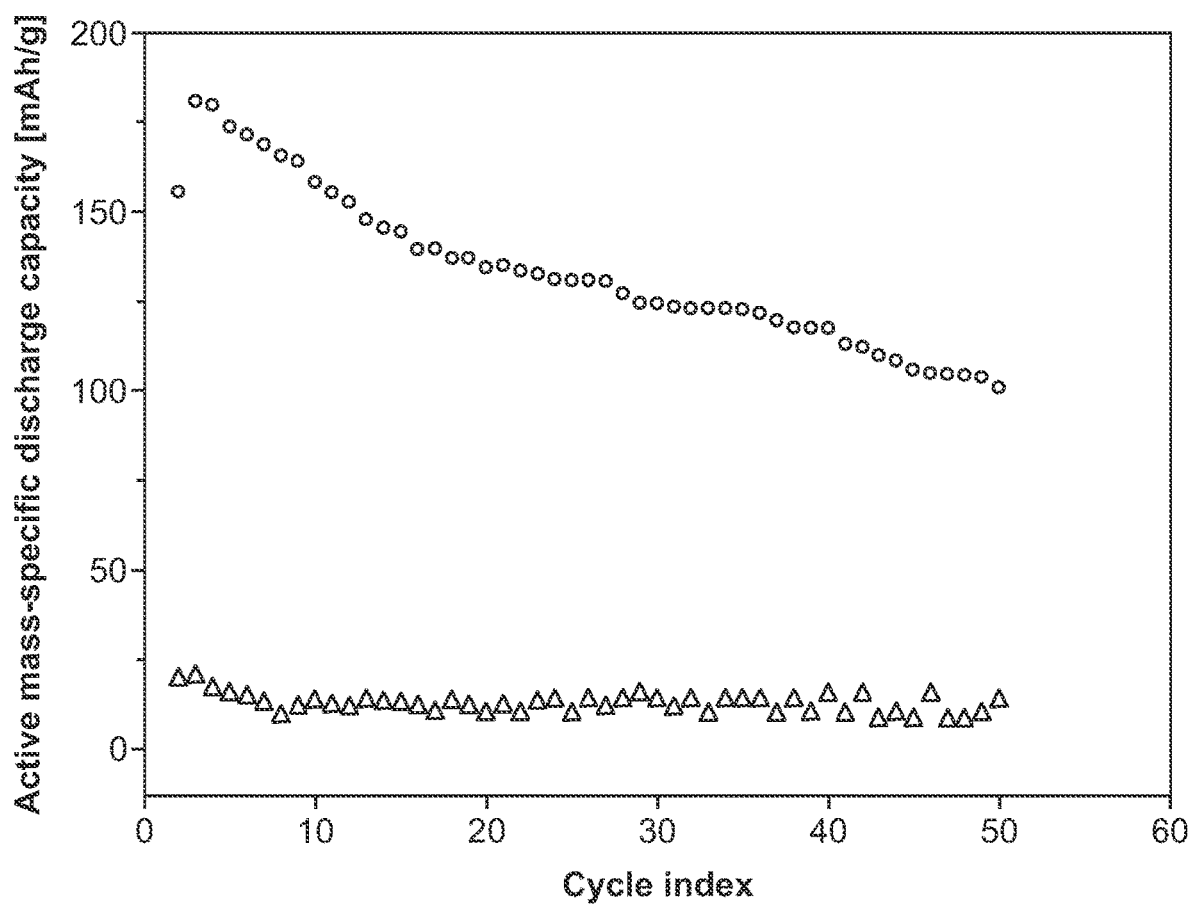

FIG. 4 shows a plot of active mass-specific discharge capacity (mAh/g) as a function of cycle index for devices made according to Example 2 with two different catholytes.

Figure 5:
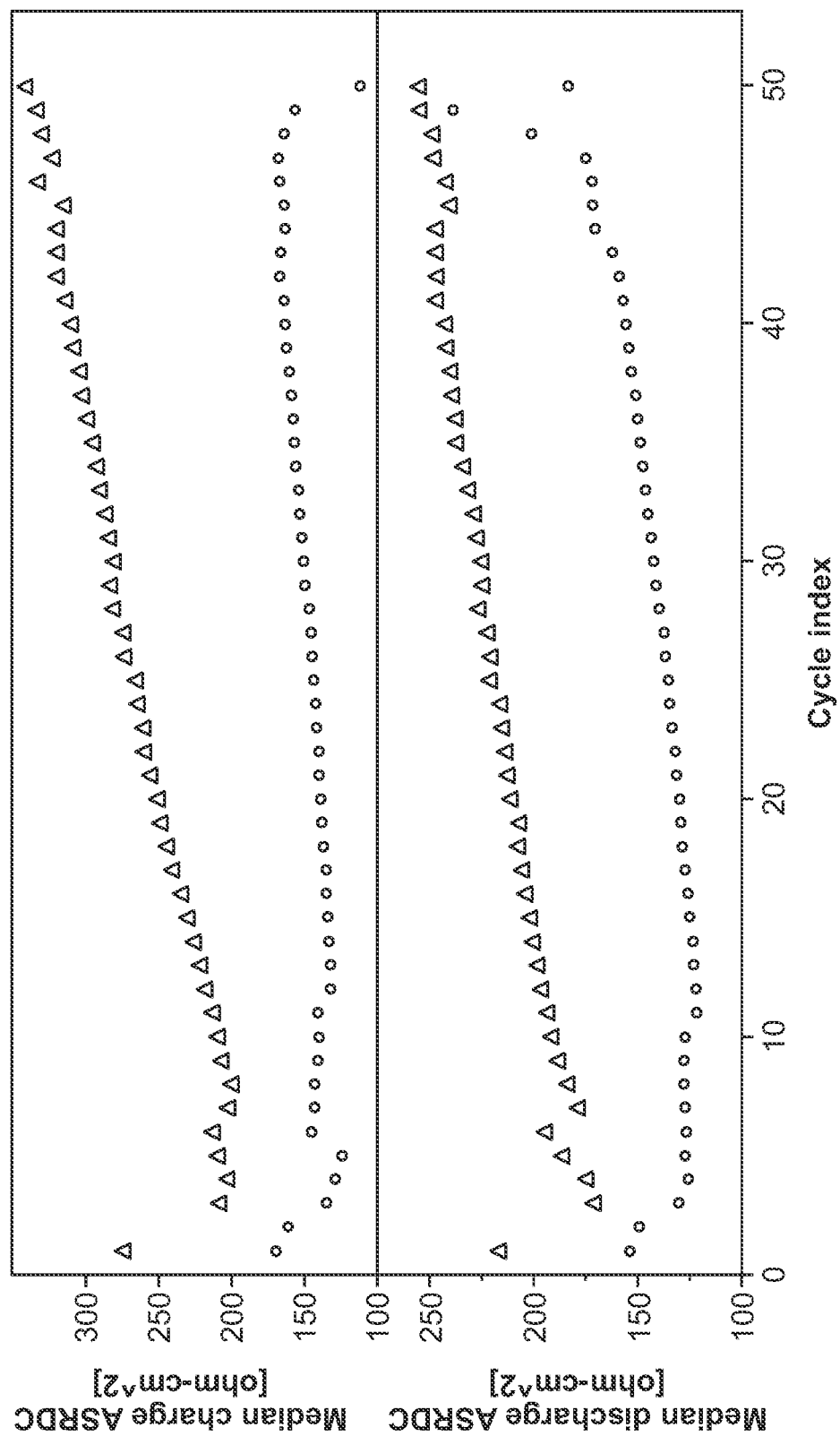

FIG. 5 shows a plot of the median charge and discharge ASR$_{dc}$ ($\Omega$-cm$^2$) for two electrochemical cells, both stored at 4.6 V, and wherein one electrochemical cell includes a catholyte including succinonitrile at 12 mol % LiBF$_4$ and wherein the other electrochemical cell includes a catholyte including EC:EMC+1 M LiPF$_6$+2 wt % FEC. In the figure, circles refer to succinonitrile+12 mol % LiBF$_4$, and triangles refer to EC:EMC at 3.7 w/w+1 M LiPF$_6$+2 wt % FEC.

Figure 6:
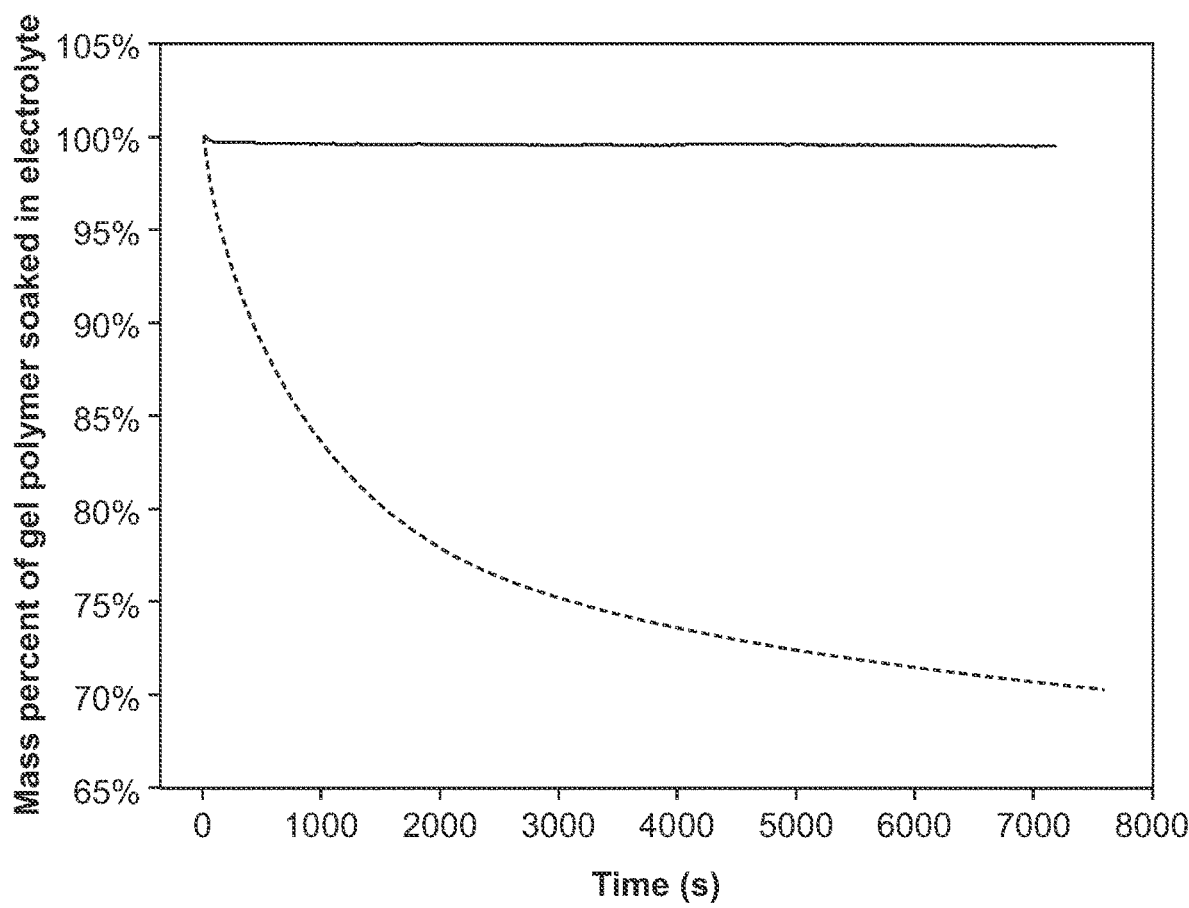

FIG. 6 shows a plot of mass percent of Gel Polymer Soaked in Electrolyte for two electrochemical cells, wherein one electrochemical cell includes a catholyte including adiponitrile and 1M LiTFSi and wherein the other electrochemical cell includes a catholyte including EC:EMC+1 M LiPF$_6$+2 wt % FEC. In the figure, solid line is adiponitrile+1 M LiTFSi, and the doted line is EC:EMC+1 M LiPF$_6$+2 wt % FEC.

Figure 7:
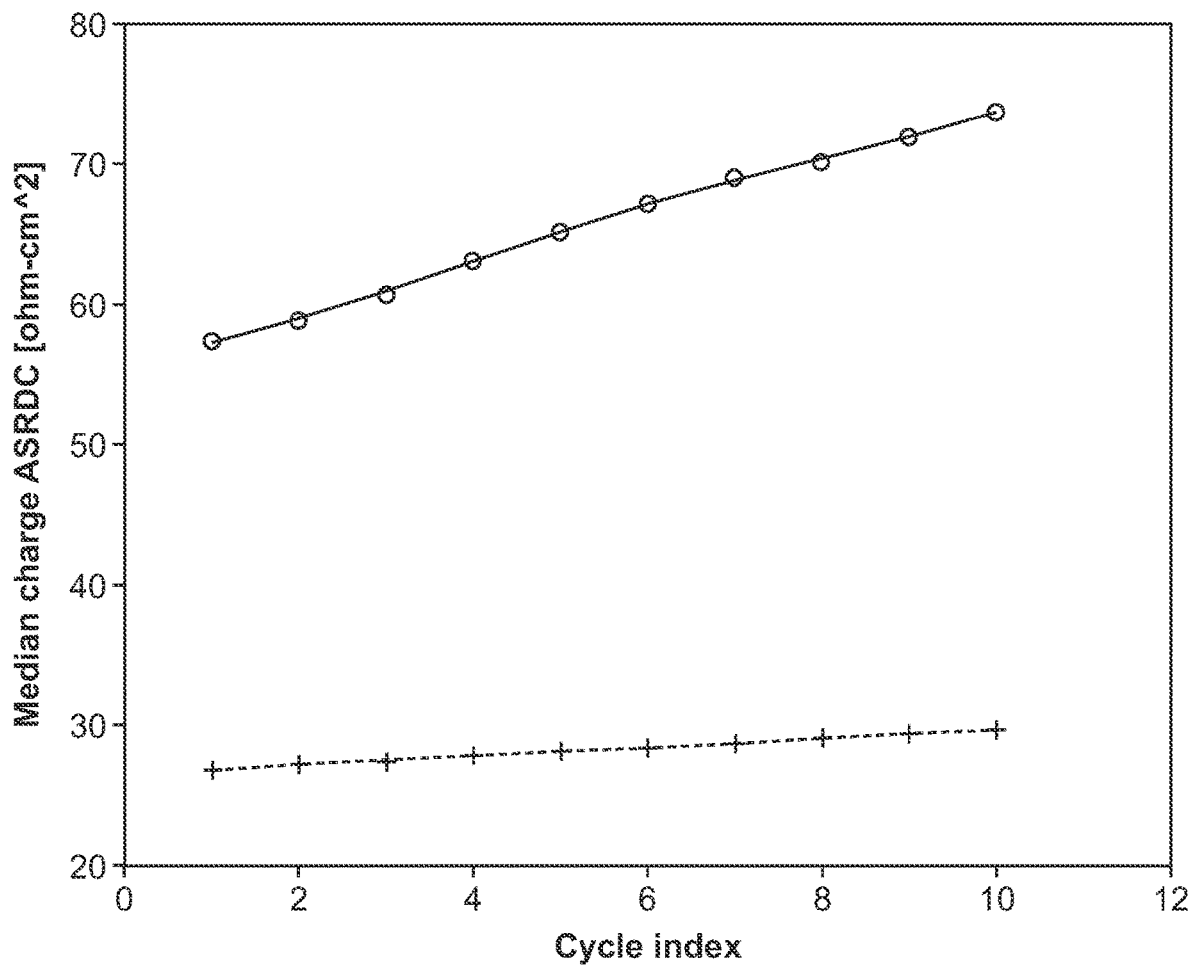

FIG. 7 shows a plot of charge ASR growth wherein the cell is prepared with sulfolane and ethylene carbonate (3:7 v/v)+2M LiPF$_6$ vs ethyl-methyl carbonate, ethylene carbonate (3:7 v/v)+1M LiPF$_6$ for 10 cycles, C/3 pulses, from 2.7-4.2 V at 45° C. The cathode is NMC, and the separator is solid-state separator material. Solid line is EC:EMC 3:7 v/v+1 MLiPF$_6$; dotted line is EC:Sulfolane 3:7 v/v+2 M LiPF$_6$.

Figure 8:
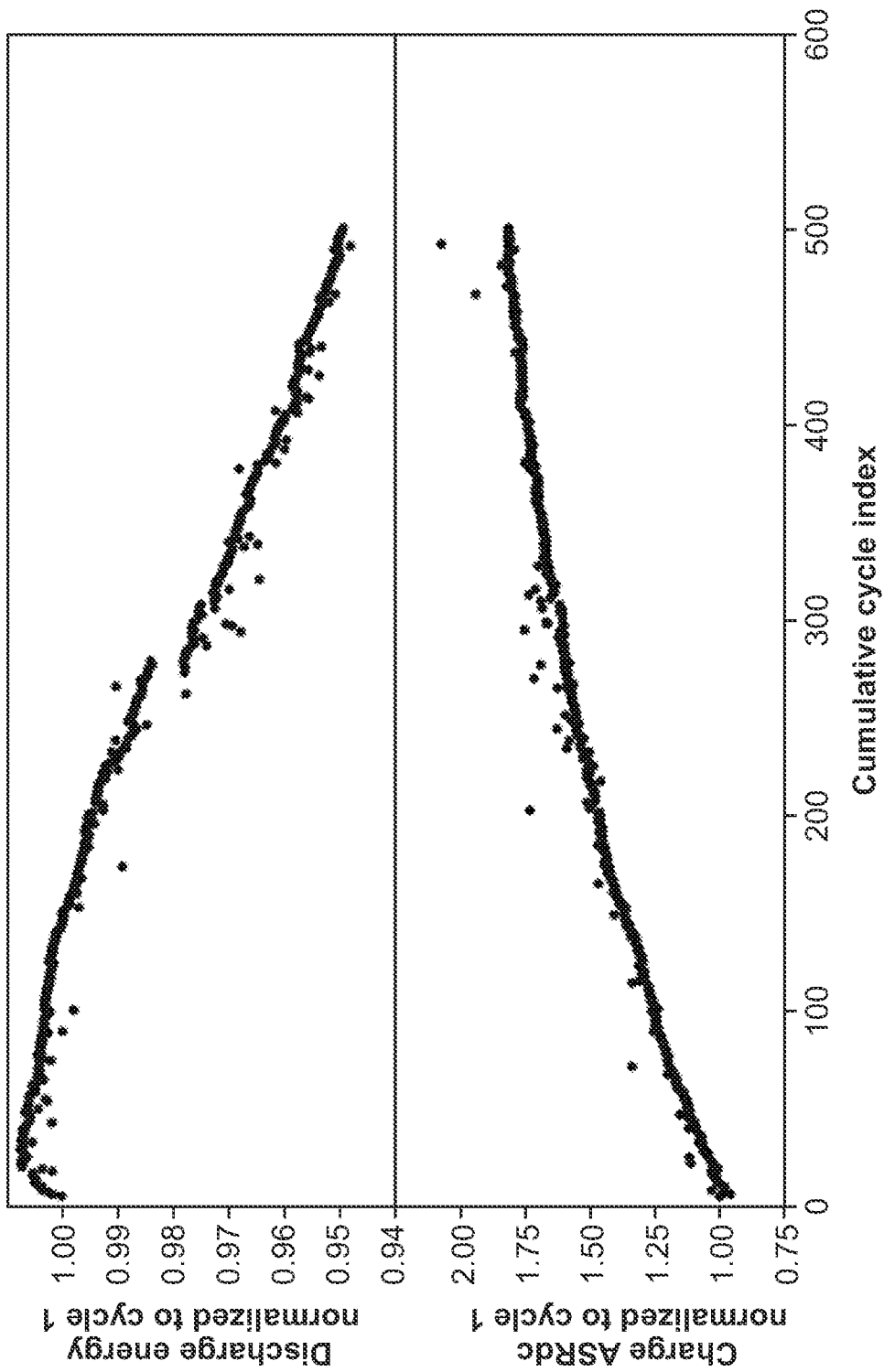

FIG. 8 shows a plot of discharge and charge ASR versus cycle life for 500 cycles for a cell.

DETAILED DESCRIPTION

A. Definitions

As used herein, the term "about," when qualifying a number, e.g., about 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "Li$^+$ ion-conducting separator" refers to an electrolyte which conducts Li$^+$ ions, is substantially insulating to electrons (e.g., the lithium ion conductivity is at least 10$^3$ times, and often 10$^6$ times, greater than the electron conductivity), and which acts as a physical barrier or spacer between the positive and negative electrodes in an electrochemical cell.

As used herein, the phrases "solid separator," "solid electrolyte," "solid-state separator," and "solid-state electrolyte" refer to Li$^+$ ion-conducting separators that are solids at room temperature and include at least 50 vol % ceramic material.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the phrase "electrochemical cell" refers to, for example, a "battery cell" and includes a positive electrode, a negative electrode, and an electrolyte therebetween which conducts ions (e.g., Li$^+$) but electrically insulates the positive and negative electrodes. In some embodiments, a battery may include multiple positive electrodes and/or multiple negative electrodes enclosed in one container.

As used herein the phrase "electrochemical stack" refers to one or more units which each include at least a negative electrode (e.g., Li, LiC$_6$), a positive electrode (e.g., Li-nickel-manganese-oxide or FeF$_3$, optionally combined with a solid-state electrolyte or a gel electrolyte), and a solid electrolyte (e.g., an oxide electrolyte set forth herein, a lithium-stuffed garnet film, or a lithium-stuffed garnet pellet) between and in contact with the positive and negative electrodes. In some examples, between the solid electrolyte and the positive electrode, there is an additional layer comprising a compliant (e.g., gel electrolyte). An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes one positive electrode, one solid electrolyte, and one negative electrode, and optionally includes a gel electrolyte layer between the positive electrode and the solid electrolyte. In some examples, the gel electrolyte layer is also included in the positive electrode. In some examples, the gel electrolyte includes any electrolyte set forth herein, including a nitrile, dinitrile, organic sulfur-including solvent, or combination thereof set forth herein.

As used herein, the term "electrolyte" refers to a material that allows ions, e.g., $Li^+$, to migrate or conduct therethrough but which does not allow electrons to conduct therethrough. Electrolytes are useful for electrically isolating the cathode and anodes of a secondary battery while allowing ions, e.g., $Li^+$, to transmit through the electrolyte. Solid electrolytes, in particular, rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., $Li^+$, through the electrolyte. In this case, a solid electrolyte layer may be also referred to as a solid electrolyte separator or solid-state electrolyte separator.

As used herein, the phrases "gel electrolyte" unless specified otherwise, refers to a suitable $Li^+$ ion conducting gel or liquid-based electrolyte, for example, those set forth in U.S. Pat. No. 5,296,318, entitled RECHARGEABLE LITHIUM INTERCALATION BATTERY WITH HYBRID POLYMERIC ELECTROLYTE. A gel electrolyte has a lithium ion conductivity of greater than $10^{-5}$ S/cm at room temperature, a lithium transference number between 0.05-0.95, and a storage modulus greater than the loss modulus at some temperature. A gel electrolyte may comprise a polymer matrix, a solvent that gels the polymer, and a lithium containing salt that is at least partly dissociated into $Li^+$ ions and anions. Alternately, a gel electrolyte may comprise a porous polymer matrix, a solvent that fills the pores, and a lithium containing salt that is at least partly dissociated into $Li^+$ ions and anions where the pores have one length scale less than 10 μm.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The term "laminating" also refers to the process whereby at least two layers comprising a solid electrolyte material are contacted together. The laminating process may include a reaction or use of a binder which adheres of physically maintains the contact between the layers which are laminated. The process of laminating one layer to another layer results in one layer being laminated to the other layer.

As used herein, the phrase "directly contacts" refers to the juxtaposition of two materials such that the two materials contact each other sufficiently to conduct either an ion or electron current. As used herein, direct contact refers to two materials in contact with each other and which do not have any materials positioned between the two materials which are in direct contact.

As used herein, the terms "cathode" and "anode" refer to the electrodes of a battery. The cathode and anode are often referred to in the relevant field as the positive electrode and negative electrode, respectively. During a charge cycle in a Li-secondary battery, Li ions leave the cathode and move through an electrolyte, to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

As used herein, the phrase "positive electrode" refers to the electrode in a secondary battery towards which positive ions, e.g., $Li^+$, conduct, flow or move during discharge of the battery. As used herein, the phrase "negative electrode" refers to the electrode in a secondary battery from where positive ions, e.g., $Li^+$, flow or move during discharge of the battery. In a battery comprised of a Li-metal electrode and a conversion chemistry, intercalation chemistry, or combination conversion/intercalation chemistry-including electrode (i.e., cathode active material; e.g., $NiF_x$, NCA, $LiNi_xMn_yCo_zO_2$ [NMC] or $LiNi_xAl_yCo_zO_2$ [NCA], wherein x+y+z=1), the electrode having the conversion chemistry, intercalation chemistry, or combination conversion/intercalation chemistry material is referred to as the positive electrode. In some common usages, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, the term "catholyte" refers to a Li ion conductor that is intimately mixed with, or that surrounds and contacts, or that contacts the positive electrode active materials and provides an ionic pathway for $Li^+$ to and from the active materials. Catholytes suitable with the embodiments described herein include, but are not limited to, catholytes having the acronyms name LPS, LXPS, LXPSO, where X is Si, Ge, Sn, As, Al, LATS, or also Li-stuffed garnets, or combinations thereof, and the like. Catholytes may also be liquid, gel, semi-liquid, semi-solid, polymer, and/or solid polymer ion conductors known in the art. In some examples, the catholyte includes a gel set forth herein. In some examples, the gel electrolyte includes any electrolyte set forth herein, including a nitrile, dinitrile, organic sulfur-including solvent, or combination thereof set forth herein.

In some examples, the electrolytes herein may include, or be layered with, or be laminated to, or contact a sulfide electrolyte. As used here, the phrase "sulfide electrolyte," includes, but is not limited to, electrolytes referred to herein as LSS, LTS, LXPS, or LXPSO, where X is Si, Ge, Sn, As, Al, LATS. In these acronyms (LSS, LTS, LXPS, or LXPSO), S refers to the element S, Si, or combinations thereof, and T refers to the element Sn. "Sulfide electrolyte" may also include $Li_aP_bS_cX_d$, $Li_aB_bS_cX_d$, $Li_aSn_bS_cX_d$ or $Li_aSi_bS_cX_d$ where X=F, Cl, Br, I, and 10%≤a≤50%, 10%≤b≤44%, 24%≤c≤70%, 0≤d≤18% and may further include oxygen in small amounts. For example, oxygen may be present as a dopant or in an amount less than 10 percent by weight. For example, oxygen may be present as a dopant or in an amount less than 5 percent by weight.

As used herein, the phrase "sulfide based electrolytes" refers to electrolytes that include inorganic materials containing S which conduct ions (e.g., $Li^+$) and which are suitable for electrically insulating the positive and negative electrodes of an electrochemical cell (e.g., secondary battery). Exemplary sulfide based electrolytes include, but are not limited to, those electrolytes set forth in International Patent Application PCT Patent Application No. PCT/US14/38283, SOLID STATE CATHOLYTE OR ELECTROLYTE FOR BATTERY USING $Li_AMP_BS_C$ (M=SI, GE, AND/OR SN), filed May 15, 2014, and published as WO 2014/186634, on Nov. 20, 2014, which is incorporated by reference herein in its entirety; also, U.S. Pat. No. 8,697,292 to Kanno, et al, the contents of which are incorporated by reference in their entirety.

As used here, the phrase "sulfide electrolyte" includes, but are not limited to, LSS, LTS, LXPS, LXPSO, where X is Si, Ge, Sn, As, Al, LATS, also Li-stuffed garnets, or combinations thereof, and the like, S is S, Si, or combinations thereof, T is Sn.

As used herein, "SLOPS" includes, unless otherwise specified, a 60:40 molar ratio of $Li_2S:SiS_2$ with 0.1-10 mol. % $Li_3PO_4$. In some examples, "SLOPS" includes $Li_{10}Si_4S_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula $(1-x)(60:40\ Li_2S:SiS_2)*(x)(Li_3PO_4)$, wherein x is from 0.01 to 0.99. As used herein, "LBS-POX" refers to an electrolyte composition of $Li_2S:B_2S_3:Li_3PO_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used here, "LBS" refers to an electrolyte material characterized by the formula $Li_aB_bS_c$ and may include oxygen and/or a lithium halide (LiF, LiCl, LiBr, LiI) at 0-40 mol %.

As used here, "LPSO" refers to an electrolyte material characterized by the formula $Li_xP_yS_zO_w$ where $0.33 \leq x \leq 0.67$, $0.07 \leq y \leq 0.2$, $0.4 \leq z \leq 0.55$, $0 \leq w \leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, the term "LBHI" or "LiBHI" refers to a lithium conducting electrolyte comprising Li, B, H, and I. More generally, it is understood to include $aLiBH_4+bLiX$ where X=Cl, Br, and/or I and where a:b=7:1, 6:1, 5:1, 4:1, 3:1, 2:1, or within the range a/b=2-4. LBHI may further include nitrogen in the form of $aLiBH_4+bLiX+cLiNH_2$ where (a+c)/b=2-4 and c/a=0-10.

As used herein, the term "LPSI" refers to a lithium conducting electrolyte comprising Li, P, S, and I. More generally, it is understood to include $aLi_2S+bP_2S_y+cLiX$ where X=Cl, Br, and/or I and where y=3-5 and where a/b=2.5-4.5 and where (a+b)/c=0.5-15.

As used herein, the term "LIRAP" refers to a lithium rich antiperovskite and is used synonymously with "LOC" or "$Li_3OCl$". The composition of LIRAP is $aLi_2O+bLiX+cLiOH+dAl_2O_3$ where X=Cl, Br, and/or I, a/b=0.7-9, c/a=0.01-1, d/a=0.001-0.1.

As used herein, "LSS" refers to lithium silicon sulfide which can be described as $Li_2S$—$SiS_2$, Li—$SiS_2$, Li—S—Si, and/or a catholyte consisting essentially of Li, S, and Si. LSS refers to an electrolyte material characterized by the formula $Li_xSi_yS_z$ where $0.33 \leq x \leq 0.5$, $0.1 \leq y \leq 0.2$, $0.4 \leq z \leq 0.55$, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is 90:10, 85:15, 80:20, 75:25, 70:30, 2:1, 65:35, 60:40, 55:45, or 50:50 molar ratio. LSS may be doped with compounds such as $Li_xPO_y$, $Li_xBO_y$, $Li_4SiO_4$, $Li_3MO_4$, $Li_3MO_3$, $PS_x$, and/or lithium halides such as, but not limited to, LiI, LiCl, LiF, or LiBr, wherein $0<x \leq 5$ and $0 \leq y \leq 5$.

As used herein, "LTS" refers to a lithium tin sulfide compound which can be described as $Li_2S$—$SnS_2$, $Li_2S$—SnS, Li—S—Sn, and/or a catholyte consisting essentially of Li, S, and Sn. The composition may be $Li_xSn_yS_z$ where $0.25 \leq x \leq 0.65$, $0.05 \leq y \leq 0.2$, and $0.25 \leq z \leq 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In. As used herein, "LATS" refers to LTS, as used above, and further comprising Arsenic (As).

As used herein, "LXPS" refers to a material characterized by the formula $Li_aMP_bS_c$, where M is Si, Ge, Sn, and/or Al, and where $2 \leq a \leq 8$, $0.5 \leq b \leq 2.5$, $4 \leq c \leq 12$. "LSPS" refers to an electrolyte material characterized by the formula $L_aSiP_bS_c$, where $2 \leq a \leq 8$, $0.5 \leq b \leq 2.5$, $4 \leq c \leq 12$. LSPS refers to an electrolyte material characterized by the formula $L_aSiP_bS_c$, wherein, where $2 \leq a \leq 8$, $0.5 \leq b \leq 2.5$, $4 \leq c \leq 12$, $d \leq 3$. Exemplary LXPS materials are found, for example, in International Patent Application No. PCT/US14/38283, SOLID STATE CATHOLYTE OR ELECTROLYTE FOR BATTERY USING $Li_4MP_bS_c$ (M=SI, GE, AND/OR SN), filed May 15, 2014, and published as WO 2014/186634, on Nov. 20, 2014, which is incorporated by reference herein in its entirety. Exemplary LXPS materials are found, for example, in U.S. patent application Ser. No. 14/618,979, filed Feb. 10, 2015, and published as Patent Application Publication No. 2015/0171465, on Jun. 18, 2015, which is incorporated by reference herein in its entirety. When M is Sn and Si—both are present—the LXPS material is referred to as LSTPS. As used herein, "LSTPSO" refers to LSTPS that is doped with, or has, O present. In some examples, "LSTPSO" is a LSTPS material with an oxygen content between 0.01 and 10 atomic %. "LSPS" refers to an electrolyte material having Li, Si, P, and S chemical constituents. As used herein "LSTPS" refers to an electrolyte material having Li, Si, P, Sn, and S chemical constituents. As used herein, "LSPSO" refers to LSPS that is doped with, or has, O present. In some examples, "LSPSO" is a LSPS material with an oxygen content between 0.01 and 10 atomic %. As used herein, "LATP," refers to an electrolyte material having Li, As, Sn, and P chemical constituents. As used herein "LAGP" refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where $2 \leq a \leq 8$, $0.5 \leq b \leq 2.5$, $4 \leq c \leq 12$, $d<3$. LXPSO refers to LXPS, as defined above, and having oxygen doping at from 0.1 to about 10 atomic %. LPSO refers to LPS, as defined above, and having oxygen doping at from 0.1 to about 10 atomic %.

As used herein, "LPS" refers to an electrolyte having Li, P, and S chemical constituents. As used herein, "LPSO" refers to LPS that is doped with or has O present. In some examples, "LPSO" is a LPS material with an oxygen content between 0.01 and 10 atomic %. LPS refers to an electrolyte material that can be characterized by the formula $Li_xP_yS_z$ where $0.33 \leq x \leq 0.67$, $0.07 \leq y \leq 0.2$ and $0.4 \leq z \leq 0.55$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein, the phrase "lithium stuffed garnet" refers to oxides that are characterized by a crystal structure related to a garnet crystal structure. U.S. Patent Application Publication No. U.S. 2015/0099190, which published Apr. 9, 2015 and was filed Oct. 7, 2014 as Ser. No. 14/509,029, is incorporated by reference herein in its entirety. This application describes Li-stuffed garnet solid-state electrolytes used in solid-state lithium rechargeable batteries. These Li-stuffed garnets generally having a composition according to $Li_A La_B M'_C M''_D Zr_E O_F$, $Li_A La_B M'_C M''_D Ta_E O_F$, or $Li_A La_B M'_C M''_D Nb_E O_F$, wherein 4<A<8.5, 1.5<B<4, 0≤C≤2, 0≤D≤2; 0≤E<2.5, 10<F<13, and M' and M'' are each, independently in each instance selected from Ga, Al, Mo, W, Nb, Sb, Ca, Ba, Sr, Ce, Hf, Rb, and Ta, or $Li_a La_b Zr_c Al_d Me''_e O_f$, wherein 5<a<8.5; 2<b<4; 0<c≤2.5; 0≤d<2; 0≤e<2, and 10<f<13 and Me'' is a metal selected from Ga, Nb, Ta, V, W, Mo, and Sb and as otherwise described in U.S. Patent Application Publication No. U.S. 2015/0099190. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=2) so that the La:(Zr/Nb/Ta) ratio is 3:2. Also, garnets used herein include, but are not limited to, $Li_x La_3 Zr_2 O_F+yAl_2O_3$, wherein x ranges from 5.5 to 9; and y ranges from 0.05 to 1. In these examples, subscripts x, y, and F are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_x La_3 Zr_2 O_{12}+yAl_2O_3$. In one embodiment, the Li-stuffed garnet herein has a composition of $Li_7 Li_3 Zr_2 O_{12}$. In another embodiment, the Li-stuffed garnet herein has a composition of $Li_7 Li_3 Zr_2 O_{12}.Al_2O_3$. In yet another embodiment, the Li-stuffed garnet herein has a composition of $Li_7 Li_3 Zr_2 O_{12}.0.22Al_2O_3$. In yet another embodiment, the Li-stuffed garnet herein has a composition of $Li_7 Li_3 Zr_2 O_{12}.0.35Al_2O_3$. In certain other embodiments, the Li-stuffed garnet herein has a composition of $Li_7 Li_3 Zr_2 O_{12}.0.5Al_2O_3$. In another embodiment, the Li-stuffed garnet herein has a composition of $Li_7 Li_3 Zr_2 O_{12}.0.75Al_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "inorganic solid-state electrolyte" is used interchangeably with the phrase "solid separator" refers to a material which does not include carbon and which conducts atomic ions (e.g., $Li^+$) but does not conduct electrons. An inorganic solid-state electrolyte is a solid material suitable for electrically isolating the positive and negative electrodes of a lithium secondary battery while also providing a conduction pathway for lithium ions. Example inorganic solid-state electrolytes include oxide electrolytes and sulfide electrolytes, which are further defined below. Non-limiting example sulfide electrolytes are found, for example, in U.S. Pat. No. 9,172,114, which issued Oct. 27, 2015, and also in U.S. Provisional Patent Application No. 62/321,428, filed Apr. 12, 2016. Non-limiting example oxide electrolytes are found, for example, in US Patent Application Publication No. 2015-0200420 A1, which published Jul. 16, 2015. In some examples, the inorganic solid-state electrolyte also includes a polymer.

As used herein, examples of the materials in International Patent Application PCT Patent Application Nos. PCT/US2014/059575 and PCT/US2014/059578, GARNET MATERIALS FOR LI SECONDARY BATTERIES AND METHODS OF MAKING AND USING GARNET MATERIALS, filed Oct. 7, 2014, which is incorporated by reference herein in its entirety, are suitable for use as the inorganic solid-state electrolytes described herein, also as the oxide based electrolytes, described herein, and also as the garnet electrolytes, described herein.

As used herein the phrase "casting a film" refers to the process of delivering or transferring a liquid or a slurry into a mold, or onto a substrate, such that the liquid or the slurry forms, or is formed into, a film. Casting may be done via doctor blade, Meyer rod, comma coater, gravure coater, microgravure, reverse comma coater, slot dye, slip and/or tape casting, and other methods known to those skilled in the art.

As used herein, the phrase "slot casting" refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 μm to 100 μm in slot opening width.

As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion.

As used herein the term "making" refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein, the phrase "providing" refers to the provision of, generation or, presentation of, or delivery of that which is provided.

As used herein, the phrase "garnet-type electrolyte" refers to an electrolyte that includes a garnet or lithium stuffed garnet material described herein as the ionic conductor.

As used herein, the phrase "antiperovskite" refers to an electrolyte characterized by the antiperovskite crystal structure. Exemplary antiperovskites are found, for example, in U.S. patent application Ser. No. 13/777,602, filed Feb. 26, 2013. Antiperovskites include but are not limited to $Li_3OBr$ or $Li_3OCl$.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$). As used here, the phrase "characterized by the formula" refers to a molar ratio of constituent atoms either as batched during the process for making that characterized material or as empirically determined.

As used herein, the term "solvent" refers to a liquid that is suitable for dissolving or solvating a component or material described herein. For example, a solvent includes a liquid, e.g., propylene carbonate, which is suitable for dissolving a component, e.g., the salt, used in the electrolyte.

As used herein, the phrase "removing a solvent" refers to the process whereby a solvent is extracted or separated from the components or materials set forth herein. Removing a solvent includes, but is not limited to, evaporating a solvent. Removing a solvent includes, but is not limited to, using a vacuum or a reduced pressure to drive off a solvent from a mixture, e.g., an unsintered thin film. In some examples, a thin film that includes a binder and a solvent is heated or also optionally placed in a vacuum or reduced atmosphere environment in order to evaporate the solvent to leave the binder, which was solvated, in the thin film after the solvent is removed.

As used herein, the phrase "nitrile" or "nitrile solvent" refers to a hydrocarbon substituted by a cyano group, or a solvent which includes a cyano (i.e., —C≡N) substituent bonded to the solvent. Nitrile solvents may include dinitrile solvents.

As used herein, the phrase "dinitrile" or "dinitrile solvent" refers to a linear hydrocarbon chain where both ends of the chain are terminated with a cyano (i.e., —C≡N) group. Example dinitrile solvents are characterized by Formula (I):

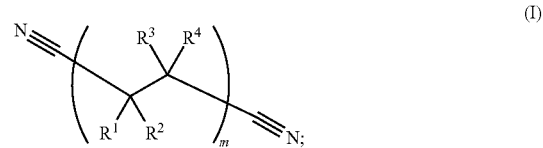

(I)

wherein:

$R^1$, $R^2$, $R^3$, and $R^4$ are, independently in each instance, selected from —CN, —$NO_2$, —$CO_2$, —$SO_4$, —H, —$SO_3$, —$SO_2$, —$CH_2$—$SO_3$, —CHF—$SO_3$, —$CF_2$—$SO_3$, —F, —Cl, —Br, and —I; and wherein subscript m is an integer from 1 to 1000.

Some exemplary nitrile and dinitrile solvents include, but are not limited to, acetonitrile, succinonitrile, glutaronitrile, malononitrile, hexanedinitrile (adiponitrile), sebaconitrile, suberonitrile, pimelonitrile, dodecanedinitrile, phthalonitrile, cis/trans-1,2-dicyanocyclohexane, and combinations thereof.

As used herein, the phrase "organic sulfur-including solvent" refers to a solvent selected from ethyl methyl sulfone, dimethyl sulfone, sulfolane, allyl methyl sulfone, butadiene sulfone, butyl sulfone, methyl methanesulfonate, and dimethyl sulfite.

As used herein, the phrase "impermeable to the catholyte" refers to a material that allows a low flux of catholyte to permeate, for example less than 1 $g/cm^2$/year, through the material, e.g., a solid separator, which is impermeable to the catholyte or its constituent components.

As used herein, the phrase "bonding layer" refers to an ionically conductive layer between two other layers, e.g., between the cathode and the solid separator. Exemplary bonding layers include the gel electrolytes, and related separator bonding agents, set forth in U.S. Provisional Patent Application No. 62/336,474, filed May 13, 2016, the entire contents of which are herein incorporated by reference in its entirety for all purposes.

As used herein, the term "HOMO" or "Highest Occupied Molecular Orbital" refers to the energy of the electron occupying the highest occupied molecular orbital, as referenced to the vacuum energy. As used herein, the term "LUMO" refers to "Lowest Unoccupied Molecular Orbital." HOMO and LUMO energy levels are calculated by DFT calculations referenced to the vacuum level. Unless otherwise specified, the DFT calculations use a B3LYP functional for exchange and correlation and a 6-311++g** basis set.

As used herein, the phrase "lithium transference" refers to the proportion of current carried by lithium ions relative to the total current. Lithium transference is a number between 0 and 1, inclusive and may be measured by the Bruce-Vincent method.

As used herein, the phrase "stability window" refers to the voltage range within which a material exhibits no reaction which materially or significantly degrades the material's function in an electrochemical cell. It may be measured in an electrochemical cell by measuring cell resistance and Coulombic efficiency during charge/discharge cycling. For voltages within the stability window (i.e. the working electrode vs reference electrode within the stability window), the increase of cell resistance is low. For example, this resistance increase may be less than 1% per 100 cycles.

As used herein, the term "LiBOB" refers to lithium bis(oxalato)borate.

As used herein, the term "LiBETI" refers to lithium bis(perfluoroethanesulfonyl)imide.

As used herein, the term "LIFSI" refers to lithium bis(fluorosulfonyl)imide.

As used herein, the term "LiTFSI" refer to lithium bis-trifluoromethanesulfonimide.

As used herein, voltage is set forth with respect to lithium (i.e., V vs. Li) metal unless stated otherwise.

As used herein, the term "LiBHI" refers to a combination of $LiBH_4$ and LiX, wherein X is Br, Cl, I, or a combination thereof.

As used herein, the term "LiBNHI" refers to a combination of $LiBH_4$, $LiNH_2$, and LiX, wherein X is Br, Cl, I, or combinations thereof.

As used herein, the term "LiBHCl" refers to a combination of $LiBH_4$ and LiCl.

As used herein, the term "LiBNHCl" refers to a combination of $LiBH_4$, $LiNH_2$, and LiCl.

As used herein, the term "LiBHBr" refers to a combination of $LiBH_4$ and LiBr.

As used herein, the term "LiBNHBr" refers to a combination of $LiBH_4$, $LiNH_2$, and LiBr.

As used herein, viscosity is measured using a Brookfield viscometer DV2T.

As used herein, the term "monolith" refers to a shaped, fabricated article with a homogenous microstructure with no structural distinctions observed optically, which has a form factor top surface area between 10 $cm^2$ and 500 $cm^2$.

As used herein, the term "vapor pressure" refers to the equilibrium pressure of a gas above its liquid at the same temperature in a closed system. Measurement procedures often consist of purifying the test substance, isolating it in a container, evacuating any foreign gas, then measuring the equilibrium pressure of the gaseous phase of the substance in the container at different temperatures. Better accuracy is achieved when care is taken to ensure that the entire substance and its vapor are at the prescribed temperature. This is often done, as with the use of an isoteniscope, by submerging the containment area in a liquid bath.

As used herein, the term "lithium salt" refers to a lithium-containing compound that is a solid at room temperature that at least partially dissociates when immersed in a solvent such as EMC. Lithium salts may include but are not limited to $LiPF_6$, LiBOB, LiTFSi, LiFSI, $LiAsF_6$, $LiClO_4$, LiI, LiBETI, $LiBF_4$. As used herein, the term "carbonate solvent" refers to a class of solvents containing a carbonate group $C(=O)(O-)_2$. Carbonate solvents include but are not limited to ethylene carbonate, dimethyl carbonate, propylene carbonate, diethyl carbonate, ethyl methyl carbonate, dimethyl ethylene carbonate, isobutylene carbonate, nitroethyl carbonate, Monofluoroethylene carbonate, fluoromethyl ethylene carbonate, 1,2-butylene carbonate, methyl propyl carbonate, isopropyl methyl carbonate, etc.

As used herein, the term "a high voltage-stable catholyte" refers to a catholyte which does not react at high voltage (4.2 V or higher versus Li metal) in a way that materially or significantly degrades the ionic conductivity of the catholyte when held at high voltage at room temperature for one week. Herein, a material or significant degradation in ionic conductivity is a reduction in ionic conductivity by an order of magnitude or more. For example, if the catholyte has an ionic conductivity of 10E-3 S/cm, and when charged to 4.2V or higher the catholyte has an ionic conductivity of 10E-4 S/cm, then the catholyte is not stable at 4.2V or higher since its ionic conductivity materially and significantly degraded at that voltage." As used herein, the term "high voltage" means at least 4.2V versus lithium metal. High voltage may also refer to higher voltage, e.g., 4.3, 4.4, 4.5, 4.6, 4.7, 4.8. 4.9, 5.0 V or higher.

As used herein, the term "chemically compatible" means that two or more materials or chemicals are chemically compatible with each other if the materials can be physically exposed to each other and the materials do not react in a way which materially or significantly degrades the electrochemical performance. Herein, electrochemical performance refers to either ionic conductivity or area-specific resistance (ASR). A material or significant degradation in ionic conductivity is a degradation by an order of magnitude or more. A material or significant degradation in ASR is a degradation by a factor of 2 or more when held at room temperature for one week.

As used herein, ASR is measured by electrochemical cycling using Arbin or Biologic unless otherwise specified to the contrary.

As used herein, ionic conductivity is measured by electrical impedance spectroscopy methods known in the art.

B. General

Set forth herein are battery architectures for batteries which include a solid-state separator which physically isolates the cathode from the anode. These architectures allow, for the first time in a rechargeable lithium battery, the use of electrolytes in the cathode, i.e., catholytes, that have no stability requirement against lithium metal or graphite, e.g., high-voltage (greater than 4.3V) stable dinitrile electrolytes. These electrolytes have advantageous properties including safety, lifetime, cyclability, voltage stability, and rate performance. In some examples, set forth herein are devices that include a high voltage, nitrile, or dinitrile or organic sulfur-including cathode-electrolyte (i.e., catholyte) which is stable at high oxidation potentials within the cathode side of an electrochemical device having a solid-state separator. The new battery architectures presented for the first time herein are not possible in a conventional Li-ion battery. Conventional battery architectures use catholytes which penetrate the anode space and therefore must be stable and/or passivating at the anode voltage and also chemically compatible with the anode materials. It is only by using a solid-state separator that the nitrile and high voltage-stable catholytes herein can be used practically in electrochemical devices as catholytes or electrolytes within the cathode space. In some examples, set forth herein are nitrile catholytes which are stable at high voltages with respect to lithium but which are not stable at low voltages with respect to lithium. In some examples, set forth herein are organic sulfur-including catholytes which are stable at high voltages with respect to lithium but which are not stable at low voltages (e.g. less than 1.5V or less than 1V) with respect to lithium, meaning that they significantly degrade in impedance or conductivity at room temperature for one week.

As shown in FIG. 1, in one example, an electrochemical cell (100) includes a positive electrode 101 of 5-200 μm thickness. This electrode 101 includes active materials 102 surrounded by a cathode-electrolyte 103. Active materials 102 may be present in 20-80 vol %, and the catholyte may be present in 5-60 vol %. The electrode 101 is layered to a solid separator 104 (e.g., a lithium-stuffed garnet electrolyte monolith or thin film). The solid separator 104 is layered to a lithium-metal negative electrode 105. The solid separator 104 may be 100 nm-100 μm thick, and the lithium metal negative electrode 105 may be 1 μm-50 μm thick. The solid separator 104 is impermeable to the catholyte-electrolyte 103.

In certain examples, the positive electrode is from 30 μm to 300 μm thick. In some examples, the positive electrode is from 40 μm to 200 μm thick. In some of these examples, the positive electrode is about 30 μm thick. In some of these examples, the positive electrode is about 40 μm thick. In some of these examples, the positive electrode is about 50 μm thick. In some of these examples, the positive electrode is about 60 μm thick. In some of these examples, the positive electrode is about 70 μm thick. In some of these examples, the positive electrode is about 80 μm thick. In some of these examples, the positive electrode is about 90 μm thick. In some of these examples, the positive electrode is about 100 μm thick. In some of these examples, the positive electrode is about 110 μm thick. In some of these examples, the positive electrode is about 120 μm thick. In some of these examples, the positive electrode is about 130 μm thick. In some of these examples, the positive electrode is about 140 μm thick. In some of these examples, the positive electrode is about 150 μm thick. In some of these examples, the positive electrode is about 160 μm thick. In some of these examples, the positive electrode is about 170 μm thick. In some of these examples, the positive electrode is about 180 μm thick. In some of these examples, the positive electrode is about 190 μm thick. In some of these examples, the positive electrode is about 200 μm thick. In some of these examples, the positive electrode is about 210 μm thick. In some of these examples, the positive electrode is about 220 μm thick. In some of these examples, the positive electrode is about 230 μm thick. In some of these examples, the positive electrode is about 240 μm thick. In some of these examples, the positive electrode is about 250 μm thick. In some of these examples, the positive electrode is about 260 μm thick. In some of these examples, the positive electrode is about 270 μm thick. In some of these examples, the positive electrode is about 280 μm thick. In some of these examples, the positive electrode is about 290 μm thick. In some of these examples, the positive electrode is about 300 μm thick.

The active material (e.g., a nickel manganese cobalt oxide, i.e., NMC, a nickel cobalt aluminum oxide, i.e., NCA, a lithium cobalt oxide, i.e., LCO, a lithium-rich nickel manganese oxide, i.e., LNMO, $FeF_3$, $CoF_2$, $CuF_2$, $CoF_3$, and related or functionally equivalent active materials) may be present in a volume fraction of 20-95%. In some examples, the volume fraction is 50-75 v %. The cathode electrolyte, or catholyte, may be present in a volume fraction of 10-50%. In some examples, the catholyte is present in a volume fraction of 20-40 volume %. The solid separator may be 0.5-100 μm thick. In some examples, the solid separator is 1-30 μm thick. The negative electrode may be 3-80 μm thick. In some examples, the negative electrode is 20-50 μm thick in the charged state.

In any of the above examples, the carbon content in the positive electrode is less than 5% w/w. In any of the above examples, the binder content in the positive electrode is less than 5% w/w.

C. Catholytes and Solid Separator Electrolytes

In some examples, set forth herein is a high voltage-stable catholyte which includes a solvent and a lithium salt. In some examples, the solvent is a nitrile solvent. In some examples, the solvent is a dinitrile solvent. In yet other examples, the solvent is a combination of a nitrile and dinitrile solvent. In yet other example the solvent is a combination of a dinitrile and another dinitrile. In yet other example, the solvent is an organic sulfur-including solvent. In yet another example, the solvent is a combination of an organic sulfur-including solvent and another aprotic solvent.

In some examples, set forth herein is a catholyte which includes a nitrile or dinitrile solvent and a lithium salt.

In some of these examples, the solvent in the catholyte is selected from the group consisting of from acetonitrile, butyronitrile, benzonitrile, glutaronitrile, hexanenitrile, fluoroacetonitrile, nitroacetonitrile, ethoxyacetonitrile, methoxyacetonitrile, pentanenitrile, propanenitrile, succinonitrile, adiponitrile, iso-butyronitrile, malononitrile and combinations thereof. In certain examples, the catholyte solvent is fluoromethyl ethylene carbonate, ethyl nitroacetate, N-Methylpyrrolidone, γ-butyrolactone, ethyl methyl sulfone, dimethyl sulfone, sulfolane, allyl methyl sulfone, butadiene sulfone, butyl sulfone, methyl methanesulfonate, dimethyl sulfite, dimethyl sulfoxide, dimethylsulfate, 3-methyl-2-oxazolidinone, fluorinated cyclic carbonate, methylene methane disulfonate, methyl cyanoacetate. In certain examples, the solvent is acetonitrile. In certain examples, the solvent is butyronitrile. In certain examples, the solvent is glutaronitrile. In certain examples, the solvent is hexanenitrile. In certain examples, the solvent is fluoroacetonitrile. In certain examples, the solvent is nitroacetonitrile. In certain examples, the solvent is iso-butyronitrile. In certain examples, the solvent is ethoxyacetonitrile. In certain examples, the solvent is pentanenitrile. In certain examples, the solvent is propanenitrile. In certain examples, the solvent is succinonitrile. In certain examples, the solvent is adiponitrile. In certain examples, the solvent is malononitrile. In certain examples, the solvent is benzonitrile. In certain examples, the solvent is methoxyacetonitrile. In certain examples, the solvent is a combination of succinonitrile and adiponitrile. In certain examples, the solvent is a combination of succinonitrile and glutaronitrile.

In some examples, the electrochemical cell set forth herein includes a dinitrile solvent which includes a dinitrile represented by Formula (I):

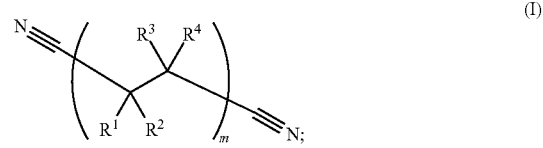

wherein:

R$^1$, R$^2$, R$^3$, and R$^4$ are, independently in each instance, selected from —CN, —NO$_2$, —CO$_2$, —SO$_4$, —SO$_3$, —SO$_2$, —H, —CH$_2$—SO$_3$, —CHF—SO$_3$, —CF$_2$—SO$_3$, —F, —Cl, —Br, and —I; and subscript m is an integer from 1 to 1000.

In some of the examples herein, R$^1$, R$^2$, R$^3$, and R$^4$ are, independently in each instance, —H or —CN.

In some of the examples herein, R$^1$, R$^2$, R$^3$, and R$^4$ are, independently in each instance, —H or —NO$_2$.

In some of the examples herein, R$^1$, R$^2$, R$^3$, and R$^4$ are, independently in each instance, —H or —CO$_2$.

In some of the examples herein, R$^1$, R$^2$, R$^3$, and R$^4$ are, independently in each instance, —H or —SO$_4$. In some of the examples herein, R$^1$, R$^2$, R$^3$, and R$^4$ are, independently in each instance, —H or —SO$_3$. In some of the examples herein, R$^1$, R$^2$, R$^3$, and R$^4$ are, independently in each instance, —H or —SO$_2$.

In some of the examples herein, R$^1$, R$^2$, R$^3$, and R$^4$ are, independently in each instance, —H or —CH$_2$—SO$_3$.

In some of the examples herein, R$^1$, R$^2$, R$^3$, and R$^4$ are, independently in each instance, —H or —CHF—SO$_3$.

In some of the examples herein, R$^1$, R$^2$, R$^3$, and R$^4$ are, independently in each instance, —H or —CF$_2$—SO$_3$.

In some of the examples herein, R$^1$, R$^2$, R$^3$, and R$^4$ are, independently in each instance, —H or —F.

In some of the examples herein, R$^1$, R$^2$, R$^3$, and R$^4$ are, independently in each instance, —H or —Cl.

In some of the examples herein, R$^1$, R$^2$, R$^3$, and R$^4$ are, independently in each instance, —H or —Br.

In some of the examples herein, R$^1$, R$^2$, R$^3$, and R$^4$ are, independently in each instance, —H or —I.

In some examples herein, the catholyte solvent includes a member selected from the group consisting of:

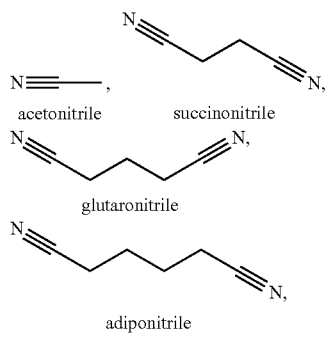

and combinations thereof. In certain examples, the solvent is a combination of succinonitrile and adiponitrile. In certain examples, the solvent is a combination of succinonitrile and glutaronitrile.

In some examples herein, the catholyte solvent includes an organic sulfur-including solvent. In some examples herein, the organic sulfur-including solvent is selected from the group consisting of ethyl methyl sulfone, dimethyl sulfone, sulfolane, allyl methyl sulfone, butadiene sulfone, butyl sulfone, methyl methanesulfonate, and dimethyl sulfite.

In some of these examples, the lithium salt is selected from LiPF$_6$, LiBOB, LiTFSi, LiFSI, LiAsF$_6$, LiClO$_4$, LiI, LiBF$_4$, and a combination thereof. In certain examples, the lithium salt is LiPF$_6$. In certain examples, the lithium salt is LiBOB. In certain examples, the lithium salt is LiTFSi. In certain examples, the lithium salt is LiBF$_4$. In certain examples, the lithium salt is LiClO$_4$. In certain examples, the lithium salt is LiFSI. In certain examples, the lithium salt is LiAsF$_6$. In certain examples, the lithium salt is LiClO$_4$. In certain examples, the lithium salt is LiI. In certain examples, the lithium salt is LiBF$_4$.

In the examples herein, the catholyte is chemically stable when in contact with a solid separator.

In some of the examples herein, the electrochemical cell further includes a bonding layer which includes a solvent selected from ethylene carbonate (EC), diethylene carbonate, diethyl carbonate, dimethyl carbonate (DMC), ethyl-methyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane (i.e., 1,1,2,2-tetrafluoro-3-(1,1,2,2-tetrafluoroethoxy)propane (F-EPE)), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO) ethyl-methyl carbonate, ethyl acetate, methyl butyrate, dimethyl ether (DME), diethyl ether, propylene carbonate, dioxolane, glutaronitrile, gamma butyrolactone, and combinations thereof. In some examples, the solvent is ethylene carbonate (EC). In some examples, the solvent is diethylene carbonate. In some examples, the solvent is dimethyl carbonate (DMC). In some examples, the solvent is ethyl-methyl carbonate (EMC). In some examples, the solvent is tetrahydrofuran (THF). In some examples, the solvent is γ-Butyrolactone (GBL). In some examples, the solvent is fluoroethylene carbonate (FEC). In some examples, the solvent is fluoromethyl ethylene carbonate (FMEC). In some examples, the solvent is trifluoroethyl methyl carbonate (F-EMC). In some examples, the solvent is fluorinated 3-(1,1,2,2-tetrafluoroethoxy)-1,1,2,2-tetrafluoropropane (i.e., 1,1,2,2-tetrafluoro-3-(1,1,2,2-tetrafluoroethoxy)propane (F-EPE)). In some examples, the solvent is fluorinated cyclic carbonate (F-AEC). In some examples, the solvent is propylene carbonate (PC). In some examples, the solvent is dioxolane. In some examples, the solvent is acetonitrile (ACN). In some examples, the solvent is succinonitrile. In some examples, the solvent is adiponitrile/hexanedinitrile. In some examples, the solvent is acetophenone. In some examples, the solvent is isophorone. In some examples, the solvent is benzonitrile. In some examples, the solvent is dimethyl sulfate. In some examples, the solvent is dimethyl sulfoxide (DMSO). In some examples, the solvent is ethyl acetate. In some examples, the solvent is methyl butyrate. In some examples, the solvent is dimethyl ether (DME). In some examples, the solvent is diethyl ether. In some examples, the solvent is dioxolane. In some examples, the solvent is glutaronitrile. In some examples, the solvent is gamma butyrolactone. In some examples, the solvent is a combination of any solvents mentioned above. This bonding layer may be used to adhere or bond the cathode to the solid separator.

In some of the examples herein, the electrochemical cell further includes a bonding layer which includes a lithium salt in the bonding layer is selected from LiPF$_6$, LiBOB, LFTSi, or combinations thereof. In certain examples, the lithium salt in the bonding layer is LiPF$_6$ at a concentration of 0.5 M to 2 M. In certain examples, wherein the lithium salt in the bonding layer is LiTFSI at a concentration of 0.5 M to 2 M.

In some of the examples herein, the catholyte solvent is a solvent having a permittivity of greater than 30. In certain of these examples, the catholyte solvent is a dinitrile-containing solvent.

In some of the examples herein, the catholyte solvent is a solvent having a viscosity of greater than 0.01 cP and less than 10 cP at 25° C.

In some of the examples herein, the catholyte solvent is a solvent having a flash point of greater than 50° C. and less than 400° C.

In some of the examples herein, the catholyte solvent is a solvent having a melting point higher than −50° C. and lower than 30° C.

In some of the examples herein, the catholyte solvent is a solvent having a boiling point of greater than 80° C.

In some of the examples herein, the catholyte solvent is a solvent having a HOMO level of more than 7.2 eV below the vacuum level as calculated by DFT (density fuctional theory) with a B3LYP (Becke, 3-parameter, Lee-Yang-Parr) exchange-correlation functional and 6-311++G basis set. In some examples, the HOMO level is more than 7.8 eV below the vacuum level as calculated by DFT with a B3LYP exchange-correlation functional and 6-311++G basis set. In some examples, the HOMO level is more than 8.2 eV below the vacuum level as calculated by DFT with a B3LYP exchange-correlation functional and 6-311++G** basis set. For example, for succinonitrile, the HOMO=−9.65 eV, and LUMO=−0.92 eV; for ethyl methyl sulfone HOMO=−8.08 eV, LUMO=−0.62 eV.

In some of the examples herein, the catholyte solvent is a solvent is polar and aprotic.

In some of the examples herein, the catholyte has a lithium transference number of greater than 0.2.

In some of the examples herein, the catholyte has a total ionic conductivity of greater than 1e-4 S/cm at 25° C.

In some of the examples herein, the catholyte solvent has a vapor pressure of lower than 2 Torr at 20° C. In some of the examples herein, the catholyte solvent has a vapor pressure of lower than 0.2 Torr at 20° C. In some of the examples herein, the catholyte solvent has a vapor pressure of lower than 2e-2 Torr at 20° C.

In some of the examples herein, the catholyte solvent has a boiling point of greater than 80° C.

In some of the examples herein, the catholyte solvent has a boiling point of greater than 250° C.

In some of the examples herein, the catholyte solvent has a viscosity of less than 10 centipoise (cP) at 25° C.

In some of the examples herein, the catholyte further comprises a carbonate solvent in addition to the nitrile or dinitrile solvent. In some examples, the catholyte further comprises a solvent selected from ethylene carbonate (EC), diethylene carbonate, diethyl carbonate, dimethyl carbonate (DMC), ethyl-methyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), propylene carbonate (PC), dioxolane, acetonitrile (ACN), succinonitrile, malononitrile, hexanedinitrile (adiponitrile), pentanedinitrile (glutaronitrile), acetophenone, isophorone, benzonitrile, dimethyl sulfate, dimethyl sulfoxide (DMSO) ethyl-methyl carbonate, ethyl acetate, methyl butyrate, dimethyl ether (DME), diethyl ether, propylene carbonate, dioxolane, glutaronitrile, gamma butyrolactone, or combinations thereof. In some of the examples herein, the catholyte further comprises a carbonate solvent in addition to the organic sulfur-including solvent. In some examples, the catholyte comprises organic sulfur-including solvent and ethylene carbonate in a ratio of about 1:9, 2:8, 3:7, 4:6, 5:5, 6:4, 7:3, 8:2, or 9:1.

In some of the examples herein, the catholyte solvent is stable up to 4.7V v. Lithium. In some of the examples herein, the catholyte solvent is stable up to 4.5V v. Lithium. In some of the examples herein, the catholyte solvent is stable up to 4.4V v. Lithium. In some examples herein, the catholyte solvent is stable up to 4.2V v. Lithium.

In some of the examples herein, the catholyte solvent is stable down to 1.5V.

In some of the examples herein, the catholyte solvent includes a nitrile represented by Formula (I):

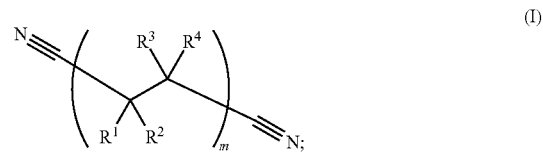

wherein:
R$^1$, R$^2$, R$^3$, and R$^4$ are, independently in each instance, selected from —CN, —NO$_2$, —CO$_2$, —SO$_4$, —SO$_3$, —SO$_2$, —CH$_2$—SO$_3$, —CHF—SO$_3$, —CF$_2$—SO$_3$, —H, —F, —Cl, —Br, and —I;
and wherein subscript m is an integer from 1 to 1000.

In some of the examples herein, R$^1$, R$^2$, R$^3$, and R$^4$ are, independently in each instance, —H or —CN.

In some of the examples herein, R$^1$, R$^2$, R$^3$, and R$^4$ are, independently in each instance, —H or —NO$_2$.

In some of the examples herein, R$^1$, R$^2$, R$^3$, and R$^4$ are, independently in each instance, —H or —CO$_2$.

In some of the examples herein, R$^1$, R$^2$, R$^3$, and R$^4$ are, independently in each instance, —H or —SO$_4$. In some of the examples herein, R$^1$, R$^2$, R$^3$, and R$^4$ are, independently in each instance, —H or —SO$_3$. In some of the examples herein, R$^1$, R$^2$, R$^3$, and R$^4$ are, independently in each instance, —H or —SO$_2$.

In some of the examples herein, R$^1$, R$^2$, R$^3$, and R$^4$ are, independently in each instance, —H or —CH$_2$—SO$_3$.

In some of the examples herein, R$^1$, R$^2$, R$^3$, and R$^4$ are, independently in each instance, —H or —CHF—SO$_3$.

In some of the examples herein, R$^1$, R$^2$, R$^3$, and R$^4$ are, independently in each instance, —H or —CF$_2$—SO$_3$.

In some of the examples herein, R$^1$, R$^2$, R$^3$, and R$^4$ are, independently in each instance, —H or —F.

In some of the examples herein, R$^1$, R$^2$, R$^3$, and R$^4$ are, independently in each instance, —H or —Cl.

In some of the examples herein, R$^1$, R$^2$, R$^3$, and R$^4$ are, independently in each instance, —H or —Br.

In some of the examples herein, R$^1$, R$^2$, R$^3$, and R$^4$ are, independently in each instance, —H or —I.

In certain examples, subscript m is an integer from 1 to 1000. In some of the examples, subscript m is an integer from 1 to 100. In some of the examples, subscript m is an integer from 1 to 10. In some of the examples, subscript m is an integer from 1 to 5. In some of the examples, subscript m is an integer from 1 to 4. In some of the examples, subscript m is an integer from 1 to 3. In some of the examples, subscript m is an integer from 1 to 2. In some of the examples, subscript m is 1.

In certain other examples, subscript m is 1. In certain other examples, subscript m is 2. In certain other examples, subscript m is 3. In certain other examples, subscript m is 4. In certain other examples, subscript m is 5. In certain other examples, subscript m is 6. In certain other examples, subscript m is 7. In certain other examples, subscript m is 8. In certain other examples, subscript m is 9. In certain other examples, subscript m is 10. In certain other examples, subscript m is 11. In certain other examples, subscript m is 12. In certain other examples, subscript m is 13. In certain other examples, subscript m is 14. In certain other examples, subscript m is 15. In certain other examples, subscript m is 16. In certain other examples, subscript m is 17. In certain other examples, subscript m is 18. In certain other examples, subscript m is 19. In certain other examples, subscript m is 20.

In some examples herein, the catholyte includes a solvent selected from the group consisting of

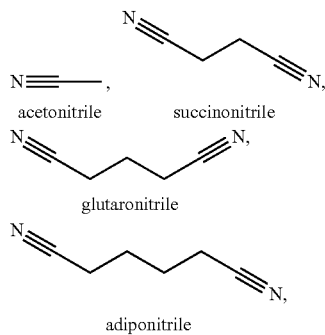

and combinations thereof. In some examples, the solvent includes both succinonitrile and glutaronitrile. In other examples, the solvent includes succinonitrile and adiponitrile.

In some examples, the dinitrile of Formula I has a total ionic conductivity of greater than 1e-4 S/cm at room temperature.

In some examples, the dinitrile is malononitrile, succinonitrile, glutaronitrile, hexanedinitrile (adipodinitrile), sebaconitrile, subernitrile, pimelonitrile, and dodecanedinitrile, phthalonitrile or cis/trans-1,2-dicyanocyclohexane, or combinations thereof.

In some examples, the lithium salt is selected from $LiPF_6$, $LiBH_4$, LiBOB, LiBETI, LiTFSi, $LiBF_4$, $LiClO_4$, LiFSI, $LiAsF_6$, $LiClO_4$, LiI, $LiBF_4$, and combination thereof.

In some examples, the lithium salt is selected from $LiPF_6$, $LiBH_4$, LiBOB, LiBETI, $LiBF_4$, $LiAsF_6$, LIFSI, LiTFSI, $LiClO_4$, and combinations thereof.

In some examples, the lithium salt is present in the dinitrile solvent at a concentration of about 5-20 mol %.

In some examples, a lithium salt is present in the dinitrile solvent at a concentration of about 12 mol %.

In some examples, the catholyte further comprises a carbonate solvent.

In some examples, the catholyte comprises $LiBF_4$, $LiCF_3SO_3$, $LiN(CF_3SO_2)_2$, or a combination thereof.

In some examples, the catholyte solvent is a combination as follows:

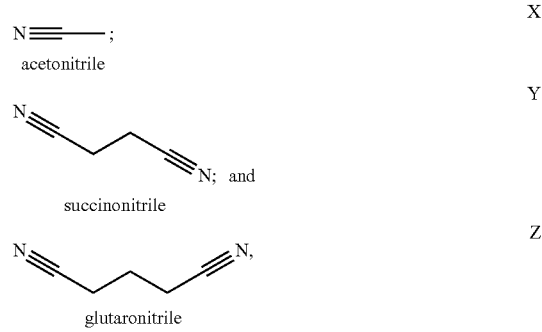

wherein coefficients X, Y, and Z refer to the respective molar amounts of each of acetonitrile, succinonitrile, and glutaronitrile. In some examples, X is 0, Y is 0.87 and Z is 0.13.

In some examples, the catholyte further includes $LiBF_4$ or $LiN(CF_3SO_2)_2$.

In some examples, the catholyte further includes an additives such as VC (vinylene carbonate), VEC (vinyl ethylene carbonate), succinic anhydride, PES (prop-1-ene, 1-3 sultone), tris(trimethylsilyl) phosphite, ethylene sulfate, PBF, TMS (1,3-propylene sulfate), methylene methanedisulfonate (MMDS), lithium nitrate, propylene sulfate, trimethoxyboroxine, FEC, combinations thereof, and the like.

In some examples, the catholyte further includes VC.

In some examples, the catholyte further includes VEC.

In some examples, the catholyte further includes succinic anhydride.

In some examples, the catholyte further includes PES.

In some examples, the catholyte further includes ethylene sulfate.

In some examples, the catholyte further includes PBF.

In some examples, the catholyte further includes TMS.

In some examples, the catholyte further includes propylene sulfate.

In some examples, the catholyte further includes trimethoxyboroxine.

In some examples, the catholyte further includes MMDS.

In some examples, the catholytes here are paired with, laminated to, adjoined, or bonded to a solid separator. In some examples, the solid separator is a Li conducting solid-state electrolyte material useful as the separator. Separator materials include those that are stable to lithium metal, including sulfides ($Li_2S$—$SiS_2$—LiX, $Li_2S$—$B_2S_3$—LiX, $Li_2S$—$P_2S_5$—LiX, $Li_2S$—$SnS_2$—LiX, $Li_2S$-$Al_2S_3$—LiX, and combinations thereof), borohydrides ($LiBH_4$—LiX, $LiNH_2$—LiX, $LiBH_4$—$LiNH_2$—LiX, and combinations thereof), LiPON, Li-stuffed garnet, lithium-rich antiperovskite, or LISICON materials. In some examples, the separators is not stable in contact with metal lithium. In some examples, the separator is a perovskite (LLTO), a phosphate (LATP, LAGP), or a Li-β-$Al_2O_3$.

In addition to dinitrile materials, such as but not limited to, malononitrile, succinonitrile, glutaronitrile, hexanedinitrile (adiponitrile), sebaconitrile, suberonitrile, pimelonitrile, dodecanedinitrile, and the like), some catholyte solvents herein include polar solvents with nitrile functionalities such as acetonitrile, butyronitrile, benzonitrile, hexanenitrile, fluoroacetonitrile, nitroacetonitrile, ethoxyacetonitrile, pentanenitrile, propanenitrile, iso-butyronitrile, and the like. In some examples, solvents may also include aprotic liquids with electron withdrawing groups such as fluorine (FEC, F-AEC, F-EPE, F-EMC, TTE). In some examples, solvents may also include aprotic liquids with a low HOMO level as calculated by density functional theory (DFT). In some other examples, solvents may also include MMDS, methyl pivalate, 1,2 dioxane, and sulfolane. In some of these examples, the oxidative stability of the dinitrile is related to its HOMO. As the HOMO of the dinitrile decreases, or is a higher (less negative) value, it is easier to oxidize the solvent.

In some examples herein, the lithium salts may include those known in the art such as, but not limited to, $LiPF_6$, LiBOB, LiBETI, $LiBF_4$, $LiAsF_6$, LiFSI, LiTFSI, $LiClO_4$, and combinations thereof.

In some examples herein, the catholyte comprises 0.57: 0.43 glutaronitrile:succinonitrile (mol/mol) and 7 mol % $LiBF_4$.

In some examples herein, the catholyte comprises 0.3:0.7 ethylene carbonate:sulfolane (v/v) and 1 M $LiPF_6$.

D. Electrochemical Devices

In some examples, set forth herein is an electrochemical cell which includes a catholyte set forth herein.

In some examples, set forth herein is an electrochemical cell which includes a catholyte set forth herein which includes a dinitrile solvent and a lithium salt.

In some examples, set forth herein is an electrochemical cell which includes a catholyte set forth herein which includes a nitrile solvent and a lithium salt.

In some examples, set forth herein is an electrochemical cell which includes a catholyte set forth herein which includes an organic sulfur-including solvent and a lithium salt.

In some examples, set forth herein is an electrochemical cell, which includes a lithium metal negative electrode, a solid separator, and a positive electrode. In these examples, the positive electrode includes an active material, and a catholyte. In these examples, the catholyte includes a dinitrile solvent and a lithium salt.

In some examples, the lithium metal negative electrode is a layer laminated to the solid separator, wherein the solid separator is a layer laminated to the positive electrode.

In some examples, the lithium metal negative electrode is laminated to the solid separator, wherein the solid separator is laminated to the positive electrode.

In some examples, the lithium metal negative electrode is formed in situ.

In some examples, solid separator is impermeable to the catholyte. In these examples, the solid separator is dense enough or the catholyte is viscous enough such that the catholyte does not penetrate through the solid separator. In some of these examples, the solid separator protects or encapsulates the lithium metal negative electrode and prevents it from contacting the dinitrile catholyte.

In some examples, the electrochemical cell includes a bonding layer between the positive electrode and the solid separator. In some examples, the bonding layer comprises a solvent and a lithium salt. In some examples, the solvent in the bonding layer is selected from the group consisting of ethylene carbonate, methylene carbonate, methyl ethyl carbonate, diethylene carbonate.

In some examples, the electrochemical cell includes a lithium salt selected from $LiPF_6$, LiBOB, LiTFSi, $LiBF_4$, $LiClO_4$, $LiAsF_6$, LiFSI, $LiClO_4$, Li, and a combination thereof.

In certain examples, the bonding layer further comprises a polymer selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly(allyl glycidyl ether) (PEO-MEEGE-AGE), polysiloxane, polyvinylidene fluoride (PVdF), polyvinylidene fluoride hexafluoropropylene (PVdF-HFP), and rubbers such as ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), and polyethylene (e.g., low density linear polyethylene). In some examples, the polymer in the bonding layer is polyacrylonitrile (PAN) or polyvinylidene fluoride hexafluoropropylene (PVdF-HFP). In some examples, the polymer in the bonding layer is selected from the group consisting of PAN, PVdF-HFP, PVDF-HFP and PAN, PMMA, PVC, PVP, PEO, and combinations thereof. In certain examples, the polymer is polyacrylonitrile (PAN). In certain examples, the polymer is polypropylene. In certain examples, the polymer is polyethylene oxide (PEO). In certain examples, the polymer is polymethyl methacrylate (PMMA). In certain examples, the polymer is polyvinyl chloride (PVC). In certain examples, the polymer is polyvinyl pyrrolidone (PVP). In certain examples, the polymer is polyethylene oxide poly(allyl glycidyl ether) PEO-AGE. In certain examples, the polymer is polyethylene oxide 2-methoxyethoxy)ethyl glycidyl ether (PEO-MEEGE). In certain examples, the polymer is polyethylene oxide 2-methoxyethoxy)ethyl glycidyl poly(allyl glycidyl ether) (PEO-MEEGE-AGE). In certain examples, the polymer is polysiloxane. In certain examples, the polymer is polyvinylidene fluoride (PVDF). In certain examples, the polymer is polyvinylidene fluoride hexafluoropropylene (PVdF-HFP). In certain examples, the polymer is a rubber such as ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), and polyethyl acrylate (PEA). In some examples, the polymer is polyethylene (e.g., low density linear polyethylene). In some examples, the polymer is a combination of any polymers mentioned above. In some examples, the solvent in the bonding layer is selected from ethylene carbonate (EC), diethylene carbonate, diethyl carbonate, dimethyl carbonate (DMC), ethylmethyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), propylene carbonate (PC), dioxolane, acetonitrile (ACN), succinonitrile, adiponitrile (hexanedinitrile), glutaronitrile (pentanedinitrile), acetophenone, isophorone, benzonitrile, dimethyl sulfate, dimethyl sulfoxide (DMSO) ethyl-methyl carbonate, ethyl acetate, methyl butyrate, dimethyl ether (DME), diethyl ether, propylene carbonate, dioxolane, gamma butyrolactone, or combinations thereof. In some of these examples, the solvent in the bonding layer is a 1:1 w/w mixture of EC:PC. In some of these examples, the lithium salt in the bonding layer is selected from $LiPF_6$, LiBOB, LFTSi, or combinations thereof. In some of these examples, the lithium salt in the bonding layer is $LiPF_6$ at a concentration of 0.5 M to 2M. In some of these examples, the lithium salt in the bonding layer is LiTFSI at a concentration of 0.5 M to 2M. In some of these examples, the lithium salt in the bonding layer is present at a concentration from 0.01 M to 10 M.

In some of these examples, the solid separator is selected from a lithium sulfide, a lithium borohydride, a LiPON, a lithium-stuffed garnet, a lithium-rich antiperovskite, a LISICON, and a combination thereof. In certain examples, the solid separator is an oxide selected from a lithium-stuffed garnet characterized by the formula $Li_xLa_yZr_zO_t \cdot qAl_2O_3$, wherein $4 < x < 10$, $1 < y < 4$, $1 < z < 3$, $6 < t < 14$, $0 \leq q \leq 1$.

In some of these examples, the solid separator is a lithium-stuffed garnet doped with Al, Nb, Ga, and/or Ta.

In some of these examples, the solid separator is a lithium-stuffed garnet characterized by $Li_aLa_bZr_cAl_d\text{-}Me''_eO_f$, wherein $5 < a < 8.5$; $2 < b < 4$; $0 < c \leq 2.5$; $0 \leq d < 2$; $0 \leq e < 2$, and $10 < f < 13$ and Me'' is a metal selected from Nb, Ga, Ta, or combinations thereof.

In some examples, the lithium-stuffed garnet is characterized by the formula $Li_xLa_yZr_zO_t \cdot 0.11(Al_2O_3)$ or $Li_xLa_yZr_zO_t \cdot (Al_2O_3)$, wherein $5 < x < 8.5$.

In some of these examples, the solid separator is a sulfide or sulfide-halide is selected from LPSI, LSS, SLOPS, LSTPS, SLOBS, and LATS.

In some of these examples, the separator is a sulfide or sulfide-halide is selected from LiBHI, LiBNHI, LiBHCl, LiBNHCl, LiBHBr, LiBNHBr, and combinations thereof.

In some of these examples, the solid separator is a thin film.

In some of these examples, the solid separator is a monolith.

In some of these examples, the solid separator is a composite of a polymer and a solid electrolyte.

In some of these examples, the catholyte solvent(s) is a solvent having a permittivity of greater than 30.

In some of these examples, the catholyte solvent(s) is a solvent having a viscosity of less than 10 cP at 25° C.

In some of these examples, the catholyte solvent(s) is a solvent having a flash point of greater than 50° C.

In some of these examples, the catholyte solvent(s) is a solvent having a melting point of lower than 30° C.

In some of these examples, the catholyte solvent(s) is a solvent having a boiling point of greater than 80° C.

In some of these examples, the catholyte solvent(s) is a solvent having a HOMO level of more than 7.2 eV below the vacuum level.

In some of these examples, the catholyte solvent(s) is polar and aprotic. In some of these example, the nitrile solvent is selected from acetonitrile, butyronitrile, benzonitrile, hexanenitrile, fluoroacetonitrile, nitroacetonitrile, malononitrile, ethoxyacetonitrile, pentanenitrile, propanenitrile, and iso-butyronitrile. In some of these example, the dinitrile solvent comprises a member selected from the group consisting of fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane (i.e., 1,1,2,2-tetrafluoro-3-(1,1,2,2-tetrafluoroethoxy)propane (F-EPE)), fluorinated cyclic carbonate (F-AEC), and TTE. In some of these example, the dinitrile solvent comprises a member selected from the group consisting of MMDS, methyl pivalate, 1,2 dioxane, sulfolane, and combinations thereof.

In some examples, the catholyte has a lithium transference number of greater than 0.2.

In some examples, the catholyte has a total ionic conductivity of greater than 1e-4 S/cm at 25° C.

In some examples, the catholyte solvent has a vapor pressure of lower than 2e-2 Torr at 20° C., or lower than 0.2 Torr at 20° C., or lower than 2 Torr at 20° C.

In some examples, the catholyte solvent has a boiling point of greater than 80° C.

In some examples, the catholyte solvent has a boiling point of greater than 250° C.

In some examples, the catholyte solvent has a viscosity of less than 10 centipoise (cP) at 25° C.

In some examples, the catholyte further comprises a carbonate solvent. In some of these examples, the catholyte further comprises a solvent selected from ethylene carbonate (EC), diethylene carbonate, diethyl carbonate, dimethyl carbonate (DMC), ethyl-methyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-Tetrafluoro-3-(1,1,2,2-tetrafluoroethoxy)propane (F-EPE), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO), ethyl acetate, methyl butyrate, dimethyl ether (DME), diethyl ether, propylene carbonate, dioxolane, glutaronitrile, and combinations thereof.

In some examples, the catholyte solvent is stable up to 4.7V v. Lithium. In some examples, the catholyte solvent is stable up to 4.5V v. Lithium. In some examples, the catholyte solvent is stable up to 4.4V v. Lithium.

In some examples, the catholyte solvent is stable towards the solid separator.

In some examples, the catholyte solvent is stable down to 1.5V.

In some examples, the dinitrile solvent is stable up to 4.7V v. Lithium.

In some examples, the dinitrile solvent is stable towards the solid separator.

In some examples, the dinitrile solvent is stable down to 1.5V.

In some examples herein, the dinitrile of Formula I has a total ionic conductivity of greater than 1e-4 S/cm at room temperature.

In some examples herein, the electrochemical cell has a cyclability wherein greater than 70% of the initial energy remains at cycle 100 when cycled at a C/3 rate at 30° C.

In some examples herein, the electrochemical cell has a lifetime wherein greater than 70% of the initial energy remains at cycle 100 when cycled at a C/3 rate at 30° C.

In some examples herein, the electrochemical cell has a rate performance wherein greater than 70% of the initial power capability at 50% state-of-charge (SOC) remains at cycle 100 when cycled at a C/3 rate at 30° C.

In some examples herein, the electrochemical cell has an oxidation potential wherein greater than 70% of the initial energy remains at cycle 100 when cycled at a C/3 rate at 30° C.

In some examples herein, the electrochemical cell has an impedance at cycle 100 less than 13% of the initial impedance when cycled at a C/3 rate at 30° C.

In any of the electrochemical cells described herein, the dinitrile may be selected from malononitrile, succinonitrile, glutaronitrile, hexanedinitrile/adiponitrile, sebaconitrile, subemitrile, pimelonitrile, and dodecanedinitrile, phthalonitrile or cis/trans-1,2-dicyanocyclohexane, and combinations thereof.

In any of the electrochemical cells described herein, the lithium salt may be selected from $LiPF_6$, $LiBH_4$, LiBOB, LiBETI, LiTFSi, $LiClO_4$, $LiAsF_6$, LiFSI, $LiClO_4$, LiI, $LiBF_4$, and combination thereof.

In any of the electrochemical cells described herein, the lithium salt may be selected from $LiPF_6$, $LiBH_4$, LiBOB, LiBETI, $LiBF_4$, $LiAsF_6$, LiFSI, LiTFSI, $LiClO_4$, and combinations thereof.

In some examples, the lithium salt is present in the dinitrile solvent at a concentration of about 5-20 mol %.

In some examples, the lithium salt is present in the dinitrile solvent at a concentration of about 12 mol %.

In some examples, the solid separator is a lithium-stuffed-garnet, an LiBHI, $Li_3N$, a lithium-sulfides, a LiPON, a LISON, or a combination thereof.

In some examples, the active material is selected from a nickel manganese cobalt oxide (NMC), a nickel cobalt aluminum oxide (NCA), $Li(NiCoAl)O_2$, a lithium cobalt oxide (LCO), a lithium manganese cobalt oxide (LMCO), a lithium nickel manganese cobalt oxide (LMNCO), a lithium nickel manganese oxide (LNMO), $Li(NiCoMn)O_2$, $LiMn_2O_4$, $LiCoO_2$, $LiMn_{2-a}Ni_aO_4$, wherein a is from 0 to 2, or $LiMPO_4$, wherein M is Fe, Ni, Co, or Mn.

In some examples, the active material is selected from $FeF_2$, $NiF_2$, $FeO_xF_{3-2x}$, $FeF_3$, $MnF_3$, $CoF_3$, $CuF_2$ materials, alloys thereof, and combinations thereof In some examples, the catholyte herein further includes a carbonate solvent.

In some examples, the catholyte includes $LiBF_4$, $LiCF_3SO_3$, $LiN(CF_3SO_2)_2$, or a combination thereof.

In some examples, the dinitrile is a combination as follows:

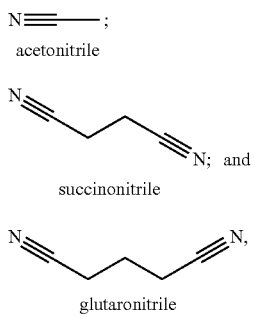

X acetonitrile

Y succinonitrile

Z glutaronitrile wherein coefficients X, Y, and Z refer to the respective molar amounts of each of acetonitrile, succinonitrile, and glutaronitrile.

In some of these examples, X is 0, Y is 0.87 and Z is 0.13.

In some examples, the electrochemical cell herein includes $LiBF_4$ or $LiN(CF_3SO_2)_2$.

In some examples, the electrochemical cell herein includes a solid separator which includes a lithium-stuffed garnet oxide characterized by the formula $Li_uLa_vZr_xO_y \cdot zAl_2O_3$, wherein
u is a rational number from 4 to 8;
v is a rational number from 2 to 4;
x is a rational number from 1 to 3;
y is a rational number from 10 to 14;
z is a rational number from 0.05 to 1; and
wherein u, v, x, y, and z are selected so that the lithium-stuffed garnet oxide is charge neutral.

In some examples of the above formula, u is selected from 4, 5, 6, 7, and 8; v is selected from 2, 3, and 4; x is selected from 1, 2, and 3; y is selected from 10, 11, 12, 13, and 14; and z is selected from 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein includes a solid separator which includes a lithium sulfide characterized by one of the following Formula:

$Li_aSi_bSn_cP_dS_eO_f$, wherein $2 \leq a \leq 8$, $b+c=1$, $0.5 \leq d \leq 2.5$, $4 \leq e \leq 12$, and $0 < f \leq 10$;

$Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$;

$Li_mP_nS_pI_q$, wherein $2 \leq m \leq 6$, $0 \leq n \leq 1$, $0 \leq p \leq 1$, $2 \leq q \leq 6$; or a mixture of $(Li_2S):(P_2S_5)$ having a molar ratio from about 10:1 to about 6:4 and LiI, wherein the ratio of $[(Li_2S):(P_2S_5)]$:LiI is from 95:5 to 50:50;

a mixture of LiI and $Al_2O_3$;

$Li_3N$;

LPS+X, wherein X is selected from Cl, I, or Br;

$vLi_2S+wP_2S_5+yLiX$;

$vLi_2S+wSiS_2+yLiX$;

$vLi_2S+wB_2S_3+yLiX$;

a mixture of $LiBH_4$ and LiX wherein X is selected from Cl, I, or Br; or $vLiBH_4+wLiX+yLiNH_2$, wherein X is selected from Cl, I, or Br; and wherein coefficients v, w, and y are rational numbers from 0 to 1.

In some examples, the electrochemical cell herein includes a solid separator which includes a lithium-stuffed garnet oxide characterized by the formula $Li_uLa_vZr_xO_y \cdot zTa_2O_5$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

In some examples of the above formula, u is selected from 4, 5, 6, 7, 8, 9, and 10; v is selected from 2, 3, and 4; x is selected from 1, 2, and 3; y is selected from 10, 11, 12, 13, and 14; and z is selected from 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein includes a solid separator which includes a lithium-stuffed garnet oxide characterized by the formula $Li_uLa_vZr_xO_y \cdot zNb_2O_5$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

In some examples of the above formula, u is selected from 4, 5, 6, 7, 8, 9, and 10; v is selected from 2, 3, and 4; x is selected from 1, 2, and 3; y is selected from 10, 11, 12, 13, and 14; and z is selected from 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein include a solid separator which includes a lithium-stuffed garnet oxide characterized by the formula $Li_uLa_vZr_xO_y \cdot z\ Ga_2O_3$, wherein
u is a rational number from 4 to 10;
v is a rational number from 2 to 4;
x is a rational number from 1 to 3;
y is a rational number from 10 to 14; and
z is a rational number from 0 to 1;

wherein u, v, x, y, and z are selected so that the lithium-stuffed garnet oxide is charge neutral.

In some examples of the above formula, u is selected from 4, 5, 6, 7, 8, 9, and 10; v is selected from 2, 3, and 4; x is selected from 1, 2, and 3; y is selected from 10, 11, 12, 13, and 14; and z is selected from 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein includes a solid separator which includes a lithium-stuffed garnet oxide characterized by the formula $Li_uLa_vZr_xO_y \cdot zTa_2O_5 \cdot bAl_2O_3$, wherein
u is a rational number from 4 to 10;
v is a rational number from 2 to 4;
x is a rational number from 1 to 3;
y is a rational number from 10 to 14;
z is a rational number from 0 to 1;
b is a rational number from 0 to 1; and
wherein z+b≤1

In some examples of the above formula, u is selected from 4, 5, 6, 7, 8, 9, and 10; v is selected from 2, 3, and 4; x is selected from 1, 2, and 3; y is selected from 10, 11, 12, 13, and 14; and z and b are each independently selected from 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein includes a solid separator which includes a lithium-stuffed garnet oxide characterized by the formula $Li_uLa_vZr_xO_y \cdot zNb_2O_5 \cdot bAl_2O_3$, wherein
u is a rational number from 4 to 10;
v is a rational number from 2 to 4;
x is a rational number from 1 to 3;
y is a rational number from 10 to 14;
z is a rational number from 0 to 1;
b is a rational number from 0 to 1;
wherein z+b≤1; and
wherein u, v, x, y, and z are selected so that the lithium-stuffed garnet oxide is charge neutral.

In some examples of the above formula, u is selected from 4, 5, 6, 7, 8, 9, and 10; v is selected from 2, 3, and 4; x is selected from 1, 2, and 3; y is selected from 10, 11, 12, 13, and 14; and z and b are each independently selected from 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein includes a solid separator which includes a lithium-stuffed garnet oxide characterized by the formula $Li_uLa_vZr_xO_y \cdot zGa_2O_3 \cdot bAl_2O_3$, wherein
u is a rational number from 4 to 10;
v is a rational number from 2 to 4;
x is a rational number from 1 to 3;
y is a rational number from 10 to 14;
z is a rational number from 0 to 1; and
b is a rational number from 0 to 1;
wherein z+b≤1;
wherein u, v, x, y, and z are selected so that the lithium-stuffed garnet oxide is charge neutral.

In some examples, u is selected from 4, 5, 6, 7, 8, 9, and 10. In some examples, v is selected from 2, 3, and 4. In some examples, x is selected from 1, 2, and 3. In some examples, y is selected from 10, 11, 12, 13, and 14. In some examples, z and b are each independently selected from 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.

In some examples, the electrochemical cell herein includes a positive electrode in direct contact with a solid electrolyte separator.

In some examples, the electrochemical cell herein includes catholyte which includes an additives such as VC (vinylene carbonate), VEC (vinyl ethylene carbonate), succinic anhydride, PES (prop-1-ene, 1-3 sultone), tris(trimethylsilyl) phosphite, ethylene sulfate, PBF, TMS (1,3-propylene sulfate), propylene sulfate, MMDS, trimethoxyboroxine, FEC, combinations thereof, and the like.

In some examples, the solid separator of the electrochemical cell is a thin and free standing sintered garnet film, wherein the film thickness is less than 50 μm and greater than 10 nm, wherein the film comprises a garnet characterized by the formula $Li_xLa_3Zr_2O_{12} \cdot qAl_2O_3$, wherein x ranges from 5.5 to 9; and q ranges from 0.05 to 1.0; and wherein the film is not adhered or fixed to a substrate. In some examples, the molar ratio of $Al_2O_3:Li_xLa_3Zr_2O_{12}$, is 0.35, 0.5, 0.67 or 1.0. In some examples, the film has a surface roughness of less than 5 μm. In some examples, the garnet has a median grain size of between 0.1 μm and 10 μm. In some examples, the film has an area specific resistance (ASR) of less than 10 Ωcm$^2$. In some examples, the film has an area specific resistance (ASR) of less than 10 Ωcm$^2$ at 80° C. In some examples, the carbon content is less than 5 atomic %. In some examples, the film thickness is about 49 μm. In some examples, the solid separator of the electrochemical cell is a thin film comprising a lithium stuffed garnet and $Al_2O_3$, wherein the lithium-stuffed garnet is characterized by the empirical formula $Li_xLa_yZr_zO_t$, wherein 5.5<x<6.7, 1.5<y<4, 1≤z≤2, 10≤t≤13; and wherein the molar ratio of $Al_2O_3$:garnet is between 0.05 to 0.7; wherein the thin film has a film thickness of about 10 nm to about 100 μm; and wherein the thin film has grains having a $d_{50}$ diameter between 100 nm and 10 μm. In some examples, the thin film is characterized by the empirical formula $Li_xLa_3Zr_2O_{12} \cdot p½Al_2O_3$; wherein 5.5<x<6.7 and 0.1<p<1.4. In some examples, the molar ratio of $Al_2O_3$:garnet is between 0.25 and 0.45. In some examples, the molar ratio of $Al_2O_3$:garnet is 0.35. In some examples, the film thickness is less than 50 μm and greater than 10 nm. In some examples, the thin film is a thin film monolith. In some examples, the thin film is a sintered thin film monolith. In some examples, the thin film has a density of about 4.5-5.2 g/cm$^3$.

E. Methods of Making

In some examples, set forth herein is a method for making a catholyte set forth herein which includes a nitrile solvent and a lithium salt, wherein the method includes providing a nitrile solvent, providing a lithium salt, mixing the dinitrile solvent and the lithium salt to form a mixture, and optionally heating the mixture. In some examples, the nitrile solvent is a dinitrile solvent. In some examples, the nitrile solvent comprises or is selected from those solvents described above with respect to the catholyte of the present invention(s). In some examples, the nitrile solvent has the properties described above with respect to the catholyte of the present invention(s). In some examples, the lithium salt is selected from those lithium salts described above with respect to the catholyte of the present invention(s). In some examples, the nitrile solvent further comprises a solvent selected from those described above with respect to the catholyte of the present invention(s).

In some examples, set forth herein is a method for making a catholyte set forth herein which includes an organic sulfur-including solvent and a lithium salt, wherein the method includes providing an organic sulfur-including solvent, providing a lithium salt, mixing the organic sulfur-including solvent and the lithium salt to form a mixture, and optionally heating the mixture. In some examples, the method includes drying the solvent(s) and/or salts before or after mixing. In some examples, the drying comprises heating and/or processing the material with a desiccating or absorbing material.

F. Methods of Using

In some examples, set forth herein is a method of using an electrochemical cell, which is set forth herein, or using an electrochemical cell that includes a catholyte, which is set forth herein. In some of these methods, the methods include charging the electrochemical cell to a voltage greater than 4.3V. In some methods, the methods also include discharging the electrochemical cell to a voltage less than 4.3V.

In some examples, the methods herein include charging the battery to a voltage greater than 4.4V. In some examples, the methods herein include charging the battery to a voltage greater than 4.5V. In some examples, the methods herein include charging the battery to a voltage greater than 4.6V. In some examples, the methods herein include charging the battery to a voltage greater than 4.7V. In some examples, the methods herein include charging the battery to a voltage greater than 4.8V. In some examples, the methods herein include charging the battery to a voltage greater than 4.9V. In some examples, the methods herein include charging the battery to a voltage greater than 5.0V. In some examples, the methods herein include charging the battery to a voltage greater than 5.1V. In some examples, the methods herein include charging the battery to a voltage greater than 5.2V. In some examples, the methods herein include charging the battery to a voltage greater than 5.3V. In some examples, the methods herein include charging the battery to a voltage greater than 5.4V. In some examples, the methods herein include charging the battery to a voltage greater than 5.5V.

In some examples, the methods herein include charging the battery under pressure. In some examples, the pressure is about 50-300 pounds per square inch (PSI). In some examples, the pressure is about 50 PSI. In some examples, the pressure is about 60 PSI. In some examples, the pressure is about 70 PSI. In some examples, the pressure is about 80 PSI. In some examples, the pressure is about 90 PSI. In some examples, the pressure is about 100 PSI. In some examples, the pressure is about 110 PSI. In some examples, the pressure is about 120 PSI. In some examples, the pressure is about 130 PSI. In some examples, the pressure is about 140 PSI. In some examples, the pressure is about 150 PSI. In some examples, the pressure is about 160 PSI. In some examples, the pressure is about 170 PSI. In some examples, the pressure is about 180 PSI. In some examples, the pressure is about 190 PSI. In some examples, the pressure is about 200 PSI. In some examples, the pressure is about 210 PSI. In some examples, the pressure is about 220 PSI. In some examples, the pressure is about 230 PSI. In some examples, the pressure is about 240 PSI. In some examples, the pressure is about 250 PSI. In some examples, the pressure is about 260 PSI. In some examples, the pressure is about 270 PSI. In some examples, the pressure is about 280 PSI. In some examples, the pressure is about 290 PSI. In some examples, the pressure is about 300 PSI.

In some examples, the methods herein include discharging the battery under pressure. In some examples, the pressure is about 50-300 pounds per square inch (PSI). In some examples, the pressure is about 50 PSI. In some examples, the pressure is about 60 PSI. In some examples, the pressure is about 70 PSI. In some examples, the pressure is about 80 PSI. In some examples, the pressure is about 90 PSI. In some examples, the pressure is about 100 PSI. In some examples, the pressure is about 110 PSI. In some examples, the pressure is about 120 PSI. In some examples, the pressure is about 130 PSI. In some examples, the pressure is about 140 PSI. In some examples, the pressure is about 150 PSI. In some examples, the pressure is about 160 PSI. In some examples, the pressure is about 170 PSI. In some examples, the pressure is about 180 PSI. In some examples, the pressure is about 190 PSI. In some examples, the pressure is about 200 PSI. In some examples, the pressure is about 210 PSI. In some examples, the pressure is about 220 PSI. In some examples, the pressure is about 230 PSI. In some examples, the pressure is about 240 PSI. In some examples, the pressure is about 250 PSI. In some examples, the pressure is about 260 PSI. In some examples, the pressure is about 270 PSI. In some examples, the pressure is about 280 PSI. In some examples, the pressure is about 290 PSI. In some examples, the pressure is about 300 PSI.

In some examples, set forth herein method of storing an electrochemical cell, wherein the methods includes providing an electrochemical cell of any one of claims, wherein the an electrochemical cell has greater than 20% state-of-charge (SOC); and storing the battery for at least one day.

In some examples, the storing the battery is for at least two days.

In some examples, the storing the battery is for at least three days.

In some examples, the storing the battery is for at least four days.

In some examples, the storing the battery is for at least five days.

In some examples, the storing the battery is for at least six days.

In some examples, the storing the battery is for at least seven days.

In some examples, the storing the battery is for at least eight days.

In some examples, the storing the battery is for at least nine days.

In some examples, the storing the battery is for at least ten days.

In some examples, the storing the battery is for at least eleven days.

In some examples, the storing the battery is for at least twelve days.

In some examples, the storing the battery is for at least thirteen days.

In some examples, the storing the battery is for at least fourteen days.

In some examples, the storing the battery is for at least fifteen days.

In some examples, the storing the battery is for at least sixteen days.

In some examples, the storing the battery is for at least seventeen days.

In some examples, the storing the battery is for at least eighteen days.

In some examples, the storing the battery is for at least nineteen days.

In some examples, the storing the battery is for at least twenty days.

In some examples, the storing the battery is for at least twenty-one days.

In some examples, the storing the battery is for at least twenty-two days.

In some examples, the storing the battery is for at least twenty-three days.

In some examples, the storing the battery is for at least twenty-four days.

In some examples, the storing the battery is for at least twenty-five days.

In some examples, the storing the battery is for at least twenty-six days.

In some examples, the storing the battery is for at least twenty-seven days. [and 28, 29, and 30 days]

In some example, the storing the battery for at least one day is at a temperature greater than 20° C. In some other examples, the storing the battery for at least one day is at a temperature greater than 40° C.

In any of the methods, above, in some examples, the method further includes charging the battery to a voltage greater than 4.3V v. Li.

G. Examples

To record conductivity, a Biologic VMP3 was used. An electrochemical cell was constructed with blocking electrodes. A catholyte material was made as a gel and was used to fill the porosity of a porous separator such as a Celgard membrane or glass fiber separator. To record the mass fraction of electrolyte, a mass loss on drying tool such as an Arizona Instruments Computrac Max 5000XL #1 was used. Electrochemical cycling was performed with Arbin BT-G or BT-2043.

To record vapor pressure, Micromeritics BET tool was used.

Example 1—ASRdc of Nitrile and Carbonate Cathode Electrolytes

In this Example, the $ASR_{dc}$ increase in electrochemical cells stored at 4.6V and 45° C. was monitored for four weeks. Herein, $ASR_{dc}$ is the Area-specific resistance (area specific resistance), which is determined by measuring the difference in voltage from the end of a 30 minute current pulse to a steady state value after 10 minutes. This means that ASR was determined by measuring a voltage change and calculating ASR by the equation, $ASR=\Delta V/j$ where $\Delta V$ is the voltage change after a current pulse in a GITT (Galvanostatic intermittent titration technique) test and j is the current density applied to the cell in the GITT test.

One electrochemical cell included a cathode, layered with a gel electrolyte (i.e., catholyte), which was layered with a solid garnet separator, and to which the opposite side of the solid garnet separator was layered with Li metal by evaporation. The cell was maintained at a pressure of about 50-300 psi. The gel electrolyte included ethylene carbonate:ethyl-methyl-carbonate (EC:EMC) in a 3:7 w/w ratio+1M $LiPF_6$ at 2 w/w FEC. The solid garnet separator is a pellet cell which can be prepared according to the methods disclosed in U.S. Provisional Application No. 62/544,724 filed Aug. 11, 2017, which is incorporated by reference herein in its entirety.

A second electrochemical cell included a cathode, layered with a electrolyte (i.e., catholyte), which was layered with a solid garnet separator, and to which the opposite side of the solid garnet separator was layered with Li metal by evaporation. The cell was maintained at a pressure of about 50-300 psi. The electrolyte included succinonitrile and 12 mol % $LiBF_4$.

The two cells described in this Example were stored at high voltage (4.6V) at 45° C. and monitored for four weeks. After each week, each cell was discharged to measure the self-discharge, followed by a full charge-discharge at C/10, 2.7-4.5V, with 30 min pulses followed by 1 min rests to measure the ASR.

From this data, the ASR was calculated and the results are presented in FIGS. 2 and 3. Median charge and discharge $ASR_{dc}$ increased each week. It can be seen that the cell impedance growth was less for the cell with the nitrile catholyte compared to the cell with the carbonate electrolyte. The data also indicates that the nitrile catholyte performs better at higher voltages and higher state of charge than do carbonate catholytes, when assembled with a solid-state electrolyte as in this Example.

Example 2—Stability Tests of Electrochemical Cells Having Nitrile or Carbonate Cathode Electrolytes This Example compares electrolyte performance when the coin cell cap, on the anode side, has been compromised. In this example, a hole was drilled into the coin cell cap, on the anode side. The cell included a cathode, layered with a electrolyte (i.e., catholyte), which was layered with a solid garnet separator, and to which the opposite side of the solid garnet separator was layered with Li metal by evaporation. The cell was maintained at a pressure of about 50-300 psi. The electrolyte included ethylene carbonate:ethyl-methyl-carbonate (EC:EMC) in a 3:7 w/w ratio+1M $LiPF_6$ at 2 w/w FEC.

In a second cell, the cell included a cathode, layered with a electrolyte (i.e., catholyte),which was layered with a solid garnet separator, and to which the opposite side of the solid garnet separator was layered with Li metal by evaporation. The cell was maintained at a pressure of about 50-300 psi. The electrolyte included succinonitrile and 12 mol % $LiBF_4$.

Both of the two cell batches in this Example were tested in a glovebox at 45° C. within an hour of the crimping. 1/16 inch holes were pre-drilled in the anode cap, which was then used in a standard cell build. Within an hour after crimping, the cells were put on test in a argon-filled glove box at 45° C. The test included a GITT charge-discharge protocol of a pulsed C/10 charge followed by a pulsed C/3 discharge.

The results are presented in FIG. 4. The cell with the nitrile electrolyte maintained a substantial fraction of its capability to discharge energy, while the cell with the carbonate electrolyte did not maintain a substantial fraction of its capability to discharge energy.

Example 3—Stability Tests of Electrochemical Cells Having Nitrile or Carbonate Cathode Electrolytes This Example compares the storage stability of two types of electrochemical cells. One electrochemical cell included a cathode, layered with a gel electrolyte (i.e., catholyte), which was layered with a solid garnet separator, and to which the opposite side of the solid garnet separator was layered with Li metal by evaporation. The cell was maintained at a pressure of about 50-300 psi. The cell included a seal around the garnet to isolate the cathode/catholyte from the lithium anode. The gel electrolyte included ethylene carbonate:ethyl-methyl-carbonate (EC:EMC) in a 3:7 w/w ratio+1M $LiPF_6$ at 2 w/w FEC.

A second electrochemical cell included a cathode, layered with a electrolyte (i.e., catholyte),which was layered with a solid garnet separator, and to which the opposite side of the solid garnet separator was layered with Li metal by evaporation. The cell was maintained at a pressure of about 50-300 psi. The electrolyte included succinonitrile and 12 mol % LiBF$_4$.

Both of the two cells were monitored for impedance growth during cycling. The electrochemical cell having the succinonitrile solvent in the cathode electrolyte was observed to have a lower impedance growth, over 50 cycles, when compared to the electrochemical cell having the carbonate solvent in the cathode electrolyte. The electrochemical cell having the succinonitrile solvent therefore had a greater power and energy capability than the electrochemical cell having the carbonate solvent in the cathode electrolyte.

The results are presented in FIG. 5.

Example 4—Stability Tests of Electrochemical Cells Having Nitrile or Carbonate Cathode Electrolytes In this example, two PVDF-HFP gel polymer films were soaked in adiponitrile or EC:EMC. While the gel films were held at 45° C., the films were monitored for mass loss over time in an open system. Over two hours, the EC:EMC evaporated quickly and significantly, whereas the adiponitrile was stable and did not evaporate quickly or significantly. This shows that the nitrile catholyte is more stable within the cathode at elevated temperature than is the carbonate catholyte. The nitrile catholyte should therefore be suitable for use in high temperature operations.

The results are shown in FIG. 6 and Table 1, below:

TABLE 1

|  | EC:EMC (3:7 vol %) + 1M LiPF6 | Adiponitrile + 1M LiTFSI |
| --- | --- | --- |
| % solvent loss on drying | 57 | 1 |

This data shows that the solvent loss on drying is much lower for nitrile solvents than for carbonate solvents.

Catholyte volatility is problematic for safety and physical stability reasons. The Example herein shows that the selected dinitriles are much less prone to solvent evaporation as compared to carbonates.

Example 5—Stability Tests of Electrochemical Cells Having Sulfolane Cathode Electrolytes Using the Micromeritics BET tool, open beakers were prepared with the following compostions in Table 2 at 45° C. with the compositions shown in the Table 2, and the vapor pressure was noted. Over two hours, the EC:EMC evaporated quickly and significantly, whereas the sulfolane system was stable and did not evaporate quickly or significantly. This shows that the sulfur-including catholyte is more physically stable within the cathode at elevated temperature than is the carbonate or nitrile catholyte. The sulfur-including catholyte should therefore be suitable for use in high temperature operations.

TABLE 2

LOW VAPOR PRESSURE (MEASURED VALUE)

| Composition | Vapor Pressure at 45° C. (mmHg) |
| --- | --- |
| Ethylene Carbonate + Sulfolane 3:7 v/v | 0.23 |

TABLE 2-continued

LOW VAPOR PRESSURE (MEASURED VALUE)

| Composition | Vapor Pressure at 45° C. (mmHg) |
| --- | --- |
| Glutaronitrile + Succinonitrile 0.57:0.43 mol/mol | 0.68 |
| EC:EMC 3:7 w/w | 27.2 |

Example 6—High Voltage Storage at a Minimal Capacity Loss

Full cells were prepared with two different catholytes: in one case, ethylene carbonate with 2M LiPF$_6$, and in the second case, sulfolane with 2M LiPF$_6$. Each full cell device was stored at 45° C. after charging to 4.5V. Each week the device was discharged, and the measured discharge capacity that remained after the week of high temperature storage is called the self-discharged capacity. Then the device was charged and discharged, and the difference between the original capacity and the newly measured reversible capacity provided the irreversible capacity loss after high voltage storage. The device was charged to 4.5V and stored for another week before repeating the discharge tests. The cells retained both self-discharged capacity and reversible capacity for four weeks of storage at 4.5V.

In this example, cathode is prepared with mass fraction 0.91 NMC, 0.010 Ketjenblack EC-600JD, 0.050 Kynar Powerflex LBG PVDF 12C9073, 0.030 SuperC65; mixed with NMP (N-mthyl-2-pyrolidone) and degassed, then cast on carbon-coated aluminum foil, dried at 120° C. under vacuum, and calendered. There was no bonding layer. Separator was 120 μm thick.

Example 7—ASR Growth for a Sulfolane System

As shown in FIG. 7, ASR growth wherein the cell was prepared with sulfolane and ethylene carbonate (3:7 v/v)+ 2M LiPF$_6$ was a lot smaller than a cell prepared with ethyl-methyl carbonate, ethylene carbonate (3:7 v/v)+1M LiPF$_6$. The data was obtained for 10 cycles, C/3 pulses, from 2.7-4.2 V at 45° C. The cathode was NMC, and the separator was solid-state separator material. As shown in FIG. 8, a cell was able to charge and discharge energy for 500 cycles with minimal gain in ASR.

As shown in these Examples, the electrochemical performance for electrochemical cells having a nitrile catholyte is surprisingly improved when compared to electrochemical cells having a carbonate catholyte. As shown in these Examples, high temperature physical stability, high voltage stability, elevated temperature power capability, and cycle life are much better for electrochemical cells having a nitrile catholyte than they are for electrochemical cells having a carbonate catholyte.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. An electrochemical cell, comprising:
a lithium metal negative electrode;
a solid separator in direct contact with the lithium metal negative electrode, wherein the solid separator is a thin film and has a film thickness of about 10 nm to about 100 µm; and
a positive electrode,
wherein the positive electrode comprises:
an active material; and
a catholyte,
wherein the catholyte comprises:
a catholyte solvent; and
a lithium salt; and
wherein the catholyte solvent comprises:
(a) a nitrile solvent, a dinitrile solvent, an organic sulfur-including solvent, or combinations thereof; and
(b) a member selected from the group consisting of methylene methanedisulfonate (MMDS), methyl pivalate, 1,2 dioxane, sulfolane, and combinations thereof.

2. The electrochemical cell of claim 1, wherein the catholyte solvent comprises a solvent selected from the group consisting of a nitrile solvent, a dinitrile solvent, and a combination thereof.

3. The electrochemical cell of claim 1, wherein the lithium metal negative electrode is a layer laminated to the solid separator; and wherein the solid separator is a layer laminated to the positive electrode.

4. The electrochemical cell of claim 1, wherein the solid separator is impermeable to the catholyte.

5. The electrochemical cell of claim 1, further comprising a bonding layer between the positive electrode and the solid separator.

6. The electrochemical cell of claim 5, wherein the bonding layer comprises a solvent and a lithium salt;
wherein the solvent in the bonding layer is selected from the group consisting of ethylene carbonate, methylene carbonate, methyl ethyl carbonate, and diethylene carbonate;
wherein the lithium salt is selected from $LiPF_6$, LiBOB, LiBETI, LiTFSi, $LiBF_4$, $LiClO_4$, $LiAsF_6$, LiFSI, LiI, and a combination thereof.

7. The electrochemical cell of claim 6, wherein the bonding layer further comprises a polymer selected from the group consisting of polyacrylonitrile (PAN), polyethylene, polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-(methoxyethoxy) ethyl glycidyl ether (PEO-MEEGE), polyethylene oxide 2-(methoxyethoxy)ethyl glycidyl poly(allyl glycidyl ether) (PEO-MEEGE-AGE), polysiloxane, polyvinylidene fluoride (PVdF), polyvinylidene fluoride hexafluoropropylene (PVdF-HFP), rubbers, nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), and combinations thereof.

8. The electrochemical cell of claim 5, wherein the solvent in the bonding layer is selected from ethylene carbonate (EC), diethylene carbonate, diethyl carbonate, dimethyl carbonate (DMC), ethyl-methyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane (i.e., 1,1,2,2-Tetrafluoro-3-(1,1,2,2-tetrafluoroethoxy)propane, F-EPE), fluorinated cyclic carbonate (F-AEC), propylene carbonate (PC), dioxolane, acetonitrile (ACN), succinonitrile, adiponitrile, hexanedinitrile, a mixture of adiponitrile and hexanedinitrile, pentanedinitrile, acetophenone, isophorone, benzonitrile, dimethyl sulfate, dimethyl sulfoxide (DMSO), ethyl acetate, methyl butyrate, dimethyl ether (DME), diethyl ether, propylene carbonate, dioxolane, glutaronitrile, and combinations thereof.

9. The electrochemical cell of claim 5, wherein the solvent in the bonding layer is a 1:1 w/w mixture of EC:PC.

10. The electrochemical cell of claim 5, wherein the lithium salt in the bonding layer is selected from $LiPF_6$, LiBOB, LiFTSi, and combinations thereof.

11. The electrochemical cell of claim 1, wherein the solid separator is selected from a lithium sulfide, a lithium borohydride, a LiPON, a lithium-stuffed garnet, a lithium-rich antiperovskite, a LISICON, and a combination thereof.

12. The electrochemical cell of claim 11, wherein the solid separator is an oxide selected from a lithium-stuffed garnet characterized by the formula $Li_xLa_y\text{-}Zr_zO_t\cdot qAl_2O_3$, wherein $4<x<10$, $1<y<4$, $1<z<3$, $6<t<14$, $0\leq q\leq 1$.

13. The electrochemical cell of claim 1, wherein the catholyte solvent is a solvent having a HOMO level of more than 7.2 eV below the vacuum level and up to 11.5 eV below the vacuum level.

14. The electrochemical cell of claim 1, wherein the catholyte solvent comprises a solvent selected from acetonitrile, methoxyacetonitrile, butyronitrile, benzonitrile, hexanenitrile, fluoroacetonitrile, nitroacetonitrile, ethoxyacetonitrile, pentanenitrile, propanenitrile, malononitrile, isobutyronitrile, and combinations thereof.

15. The electrochemical cell of claim 1, wherein the catholyte further comprises a solvent selected from ethylene carbonate (EC), diethylene carbonate, diethyl carbonate, dimethyl carbonate (DMC), ethyl-methyl carbonate (EMC), tetrahydrofuran (THF), γ-Butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane (i.e., 1,1,2,2-tetrafluoro-3-(1,1,2,2-tetrafluoroethoxy) propane (F-EPE)), fluorinated cyclic carbonate (F-AEC), propylene carbonate (PC), dioxolane, acetonitrile (ACN), succinonitrile, adiponitrile, hexanedinitrile, pentanedinitrile, acetophenone, isophorone, benzonitrile, dimethyl sulfate, dimethyl sulfoxide (DMSO), ethyl acetate, methyl butyrate, dimethyl ether (DME), diethyl ether, dioxolane, glutaronitrile, and combinations thereof.

16. The electrochemical cell of claim 1, wherein the catholyte solvent has a stability window up to 4.7 V v. Lithium.

17. The electrochemical cell of claim 1, wherein the catholyte solvent comprises a nitrile represented by Formula (I):

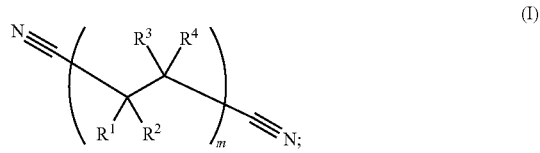

wherein:
$R^1$, $R^2$, $R^3$, and $R^4$ are, independently in each instance, selected from —CN, —$NO_2$, —$CO_2$, —$SO_4$, —$SO_3$, —SO$_2$, —CH$_2$—SO$_3$, —CHF—SO$_3$, —CF$_2$—SO$_3$, —H, —F, —Cl, —Br, and —I; and wherein subscript m is an integer from 1 to 1000.

18. The electrochemical cell of claim 1, wherein the catholyte solvent comprises a nitrile is selected from the following nitriles:

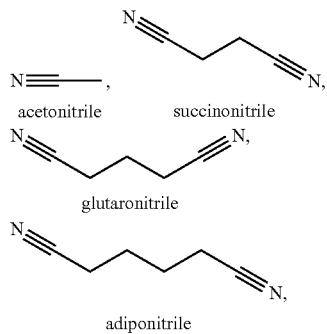

and combinations thereof.

19. The electrochemical cell of claim 1, wherein the solid separator comprises:

a lithium-stuffed garnet oxide characterized by the formula Li$_u$La$_v$Zr$_x$O$_y$·zAl$_2$O$_3$, wherein u is a rational number from 4 to 8;

v is a rational number from 2 to 4;

x is a rational number from 1 to 3;

y is a rational number from 10 to 14; and z is a rational number from 0.05 to 1;

wherein u, v, x, y, and z are selected so that the lithium-stuffed garnet oxide is charge neutral.

20. The electrochemical cell of claim 7, wherein the polyethylene is low density linear polyethylene.

21. The electrochemical cell of claim 7, wherein the rubbers are ethylene propylene (EPR).

* * * * *